United States Patent
Noriega et al.

(10) Patent No.: US 8,483,702 B2
(45) Date of Patent: *Jul. 9, 2013

(54) CHROMATIC SCHEDULER FOR NETWORK TRAFFIC WITH DISPARATE SERVICE REQUIREMENTS

(75) Inventors: Dimas Noriega, Woodstock, GA (US);
Arthur Brisebois, Cumming, GA (US);
Giuseppe De Rosa, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,764

(22) Filed: Feb. 1, 2012

(65) Prior Publication Data

US 2012/0134267 A1 May 31, 2012

Related U.S. Application Data

(63) Continuation of application No. 12/646,809, filed on Dec. 23, 2009.

(51) Int. Cl.
*H04M 3/00* (2006.01)
*H04W 72/00* (2009.01)
*H04J 1/16* (2006.01)

(52) U.S. Cl.
USPC ......... 455/453; 455/418; 455/452.2; 370/229

(58) Field of Classification Search
USPC ... 455/423–425, 448, 450–451, 452.1–452.2, 455/453, 500, 509, 512–513, 517, 522, 524–526, 550.1, 556.2, 560–561, 418–420; 370/328–330, 332–333, 338, 341, 343, 348, 370/229–230, 230.1
See application file for complete search history.

(56) References Cited

U.S. PATENT DOCUMENTS

| | | | |
|---|---|---|---|
| 7,139,251 B1 | 11/2006 | Varma | |
| 7,177,351 B2 * | 2/2007 | Kadous | ........................ 375/225 |
| 7,206,586 B2 | 4/2007 | Kim et al. | |
| 7,729,307 B2 | 6/2010 | Legg | |
| 7,738,374 B2 | 6/2010 | Yagyu et al. | |
| 7,848,759 B2 | 12/2010 | Kim et al. | |
| 7,899,011 B2 | 3/2011 | Petrovic et al. | |

(Continued)

OTHER PUBLICATIONS

Notice of Allowance dated Nov. 9, 2011 for U.S. Appl. No. 12/646,809, 16 pages.

*Primary Examiner* — Meless Zewdu
(74) *Attorney, Agent, or Firm* — Turocy & Watson, LLP

(57) ABSTRACT

System(s) and method(s) are provided for managing network capacity in a wireless network that serves various traffic flows with disparate quality of service requirements. Management can be based on multi-stage scheduling in frequency-time domain. A first scheduling stage can generate an allocation of radio resources that minimizes inter-cell interference amongst a plurality of base stations. Based on the first-stage allocation of radio resources, a second scheduling stage can compute flow capacity for a set of radio resources specific to a base station, and acquire guaranteed-bit-rate (GBR) and non-guaranteed GBR traffic flows. GBR traffic flows can be matched to computed flow capacity to generate an allocation of frequency-time resources. In second scheduling stage, GBR traffic flows can be scheduled based at least in part on allocated resources and priority queuing. Based on allocation(s) in first and second scheduling stages, a third scheduling stage can schedule non-GBR traffic flows based at least in part on fair scheduling.

20 Claims, 21 Drawing Sheets

U.S. PATENT DOCUMENTS

| | | |
|---|---|---|
| 8,009,623 B2 | 8/2011 | Higuchi et al. |
| 2004/0001429 A1* | 1/2004 | Ma et al. .................. 370/210 |
| 2004/0205166 A1 | 10/2004 | DeMoney |
| 2008/0004033 A1* | 1/2008 | Tiedemann et al. .......... 455/453 |
| 2008/0186862 A1* | 8/2008 | Corbett et al. ............. 370/237 |
| 2009/0073926 A1 | 3/2009 | Lee et al. |
| 2009/0258654 A1 | 10/2009 | Hagerman |
| 2010/0120459 A1* | 5/2010 | Delaval ..................... 455/509 |
| 2010/0135229 A1* | 6/2010 | Lohr et al. ................. 370/329 |

* cited by examiner

CHROMATIC SCHEDULER FOR NETWORK TRAFFIC WITH DISPARATE SERVICE REQUIREMENTS

CROSS REFERENCE TO RELATED APPLICATIONS

This application is a continuation of U.S. patent application Ser. No. 12/646,809, filed on Dec. 23, 2009, entitled "CHROMATIC SCHEDULER FOR NETWORK TRAFFIC WITH DISPARATE SERVICE REQUIREMENTS." The entirety of the aforementioned application is incorporated by reference herein.

TECHNICAL FIELD

The subject disclosure relates to wireless communications and, more particularly, to management of network resource allocation for traffic with disparate service requirements.

BACKGROUND

Network resources are scarce and costly to acquire from both a regulatory and an economical perspective. Availability of portions of the spectrum of electromagnetic radiation employed to transport wireless signal, and power allowances for communication of such signal are highly regulated. Development and deployment of new radio technologies that more efficiently exploit available network resources can be time consuming and can require substantive financial commitment from telecommunication carrier(s). Thus, productive management of network resources can be paramount to the commercial viability of telecommunication carrier(s). In particular, network planning and associated network capacity administration can be principal to delivery of high-quality telecommunication service and subscriber satisfaction, on which much of the commercial success of telecommunication carrier(s) relies.

As wireless communication becomes ubiquitous and integrated with other non-wireless communication technologies and services, an ever-increasing number of subscribers demand service with the ensuing operational pressure in network capacity. Accordingly, preservation of quality of service (QoS) for guaranteed-bit-rate traffic while retaining satisfactory non-GBR (n-GBR) traffic QoS becomes increasingly difficult. Conventional solutions to management of network capacity and QoS preservation, such as semi-persistent scheduling, can allow satisfactory delivery of GBR traffic at the expense of poor dynamic response to traffic conditions in loaded cells or sectors and ensuing detriment to capacity management.

SUMMARY

The following presents a simplified summary of the subject disclosure in order to provide a basic understanding of some aspects thereof. This summary is not an extensive overview of the various embodiments of the subject disclosure. It is intended to neither identify key or critical elements nor delineate any scope. Its sole purpose is to present some concepts in a simplified form as a prelude to the more detailed description that is presented later. It will also be appreciated that the detailed description may include additional or alternative embodiments beyond those described in this summary.

One or more embodiments provide system(s) and method(s) for managing network capacity in a wireless network that serves various traffic flows with disparate quality of service requirements. Management can be based on multi-stage scheduling in frequency-time domain, wherein the multiple stages of scheduling can be periodically affected, with each stage having an associated period. The multi-stage scheduling in frequency-time domain is termed herein, e.g., as chromatic scheduling, in that radio resources are cast and administered in terms of colors and associated color saturation and color luminance. A color can be a specific block of available frequency-time resources, color saturation can be the spectral span of frequency resources allotted to a color, and color luminance can be a transmit power allocated to at least a portion of frequency-time resources within a color.

One or more functional elements that implement such chromatic scheduling are termed herein, e.g., as component(s) of a chromatic scheduler. A first scheduling stage can generate an allocation of radio resources for a set of base stations that minimizes inter-cell interference amongst a plurality of base stations in the set. The allocation of radio resources can result in a resource exclusion list that can mitigate spectral overlap of allocated radio resources for disparate base stations. Based on the first-stage allocation of radio resources, a second scheduling stage can acquire radio link quality indicators and associated modulation and coding scheme indicators, and compute flow capacity for a set of radio resources utilized by a base station. In the second scheduling stage, guaranteed-bit-rate (GBR) and non-guaranteed GBR traffic flows can be acquired. GBR traffic flows can be matched to computed flow capacity or bit-rate requirement(s) to generate an allocation of frequency-time resources, whereas non-GBR traffic flows can be allocated remaining frequency-time resources. In scenarios in which Physical Downlink Shared Channel (PDSCH) power control is employed, PDSCH attenuation can be included in the determination of a satisfactory (e.g., optimal or nearly optimal) allocation of frequency-time resources. In addition, in the second scheduling stage, GBR traffic flows can be scheduled based at least in part on the allocated resources and priority queuing. Based on the radio resource allocation(s) effected in the first and second scheduling stages, a third scheduling stage can schedule non-GBR traffic flows based at least in part on fair scheduling.

Aspects, features, or advantages of the subject disclosure can be exploited in substantially any, or any, wireless telecommunication, or radio, technology or network; Non-limiting examples of such technologies or networks include femtocell technology, Worldwide Interoperability for Microwave Access (WiMAX); Third Generation Partnership Project (3GPP) Long Term Evolution (LTE); 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); UMTS Terrestrial Radio Access Network (UTRAN); Zigbee, and other 802.xx wireless technologies; or LTE Advanced. Additionally, substantially all aspects of the subject disclosure can include legacy telecommunication technologies or non-mobile communication technologies that are integrated to wireless networks.

To the accomplishment of the foregoing and related ends, the subject disclosure, then, comprises the features hereinafter fully described. The following description and the annexed drawings set forth in detail certain illustrative aspects of the subject disclosure. However, these aspects are indicative of but a few of the various ways in which the principles of the disclosure may be employed. Other aspects, advantages and novel features of the disclosure will become apparent from the following detailed description of the disclosure when considered in conjunction with the drawings.

DETAILED DESCRIPTION

Figure 1:
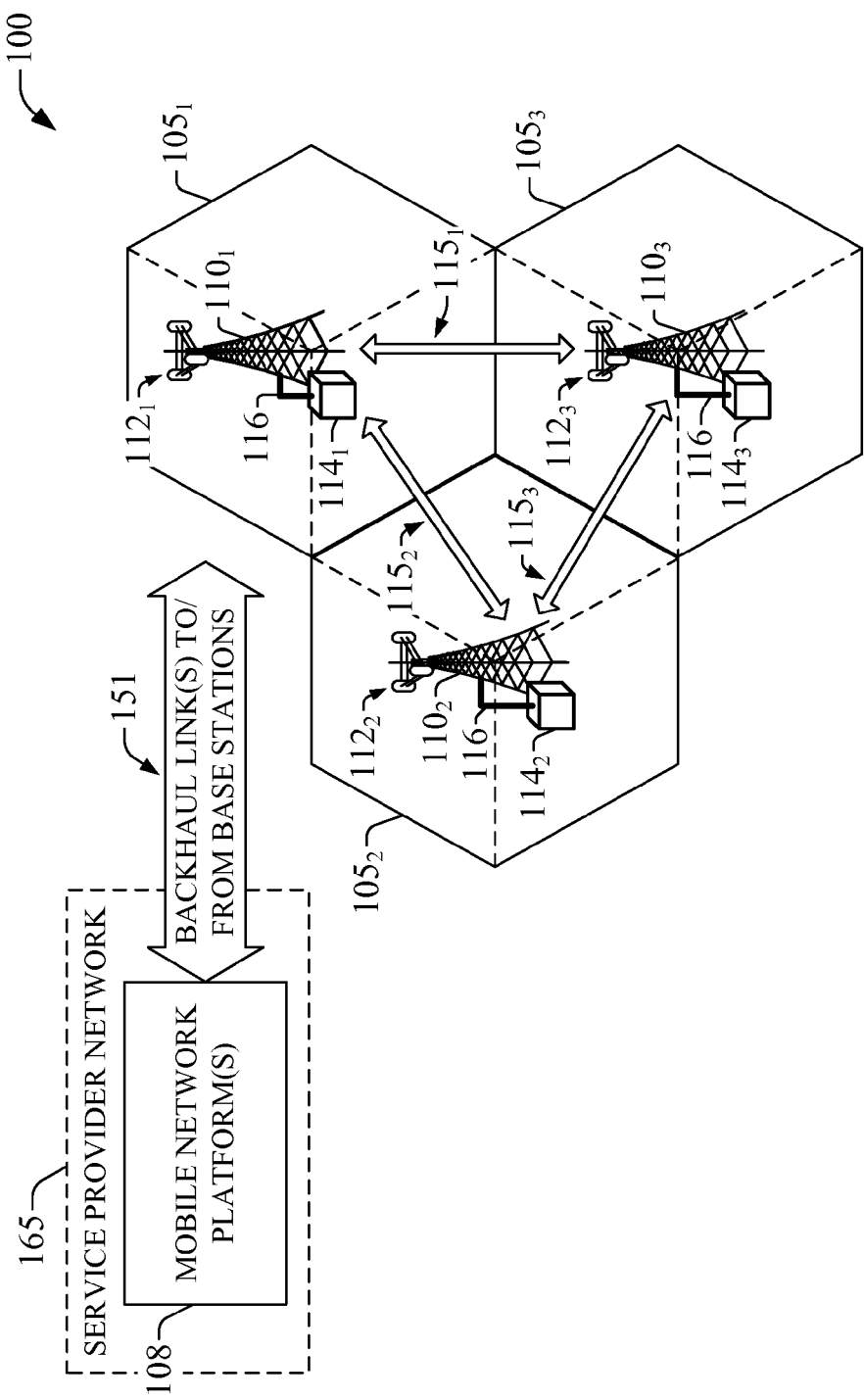
FIG. 1 illustrates a schematic example wireless environment that can operate in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in this application, the terms "component," "system," "platform," "node," "layer," "selector," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by a software or firmware application executed by a processor, wherein the processor can be internal or external to the apparatus and executes at least a part of the software or firmware application. In yet another example, a component can be an apparatus that provides specific functionality through electronic components without mechanical parts, the electronic components can include a processor therein to execute software or firmware that provides at least in part the functionality of the electronic components. In one example, interface(s) can include input/output (I/O) components as well as associated processor, application, or Application Programming Interface (API) components. While the foregoing examples are directed to aspects of a component, the exemplified aspects or features can also apply to a system, platform, node, layer, selector, interface, and the like.

Also, components can execute from various computer readable media having various data structures stored thereon. Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings can be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any or any data stream or signaling stream. The foregoing terms are utilized interchangeably in the subject specification and related drawings. Likewise, the terms "access point (AP)," "base station," "Node B," "evolved Node B (eNode B)," and the like, are utilized interchangeably in the subject disclosure, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. Such terms can refer to human entities or automated components supported through artificial intelligence (e.g., a capacity to make inference based on complex mathematical formalisms) that can provide simulated vision, sound recognition and so forth.

Further yet, the terms "set" as employed herein excludes the empty set. Thus, a "set" in the subject disclosure includes one or more elements or entities. As an illustration, as set of devices includes one or more devices, or a set of base stations includes K base stations with K a natural number greater than or equal to unity.

It is noted that various aspects of the subject disclosure are presented in terms of systems or embodiments that may include a number of components, layers, nodes, interfaces, platforms, or the like. It is to be understood and appreciated that the various systems or embodiments can include additional components, layers, etc. and/or may not include all of the components, layers, nodes, interfaces, platforms, etc. discussed in connection with the annexed drawings. A combination of these approaches may also be used.

With reference to the drawings, FIG. 1 is a schematic example wireless environment 100 that can operate in accordance with aspects described herein. In particular, example wireless environment 100 illustrates a set of macro cells. Three macro cells $105_1$-$105_3$ comprise the illustrative wireless environment; however, it should be appreciated that wireless cellular network deployments can encompass up to $10^4$-$10^5$ coverage macro cells. Coverage macro cells $105_\lambda$ ($\lambda$=1, 2, 3) are illustrated as hexagons; however, coverage cells can adopt other geometries that can be dictated by a deployment configuration or floor plan, geographic areas to be covered, and so on. Each macro cell $105_\lambda$ can be sectorized in a $2\pi/3$-radians central-angle configuration in which each macro cell includes three sectors, demarcated with dashed lines in FIG. 1. It should be appreciated that other sectorizations are possible, and aspects or features of the subject disclosure can be exploited regardless of type of sectorization. Macro cells $105_1$, $105_2$, and $105_3$ can be served respectively through Node B $110_1$, $110_2$, and $110_3$ and respectively associated radio component(s) $114_1$, $114_2$, and $114_3$. It is noted that radio component(s) (e.g., $114_1$-$114_3$) can be functionally coupled through links 116 such as cables (e.g., RF and microwave coaxial lines), ports, switches, connectors, and the like, to a set of one or more antennas (e.g., $112_1$, $112_2$, $112_3$) that transmit and receive wireless signals. A radio network controller (not shown), which can be a part of mobile network platform(s) 108, and set of base stations (e.g., Node B $110_n$, with n=1, 2, 3) that serves a set of macro cells; electronic circuitry or components associated with the base stations in the set of base stations; and a set of respective wireless links (e.g., links $115_\lambda$, with $\lambda$=1, 2, 3) operated in accordance to a radio technology through the base stations can form a macro radio access network (RAN). Based on network features, the radio controller can be distributed among the set of base stations or associated radio equipment. In an aspect, for UMTS-based networks, wireless links $115_\lambda$ can embody a Uu interface.

Mobile network platform(s) 108 can facilitate circuit switched (CS)-based and packet-switched (PS)-based (e.g., internet protocol (IP), frame relay, or asynchronous transfer mode (ATM)) traffic and signaling generation, and delivery and reception, for networked telecommunication in accordance with various radio technologies for disparate markets. In an aspect, CS-based traffic can include voice and video streaming, while PS-based traffic can comprise data associated with IP-based applications such as File Transfer Protocol (FTP) server-client suites, web browsers, VoIP server-client environments, or the like. In addition telecommunication can exploit various frequency bands, or carriers, which include all EM frequency bands licensed by the service provider, or service provider network 165, (e.g., personal communication services (PCS), advanced wireless services (AWS), general wireless communications service (GWCS), and so forth), and all unlicensed frequency bands currently available for telecommunication (e.g., the 2.4 GHz industrial, medical and scientific (IMS) band or one or more of the 5 GHz set of bands). In addition, wireless network platform(s) 108 can control and manage base stations $110_\lambda$, and radio component(s) associated thereof, in disparate macro cells $105_\lambda$ via, for example, a wireless network management component (e.g., radio network controller(s), cellular gateway node(s) or associated serving node(s)). Similarly, wireless network platform(s) 108 also can control and manage radio component(s) in distributed antenna system(s) (DAS(s)). Moreover, wireless network platform(s) can integrate disparate network technologies (e.g., femtocell network(s), Wi-Fi network(s), broadband network(s), service network(s), enterprise network(s) . . . ), and associated components or infrastructure. In cellular wireless technologies (e.g., 3rd Generation Partnership Project (3GPP) Universal Mobile Telecommunication System (UMTS), Global System for Mobile Communication (GSM)), wireless network platform 108 can be embodied in a core network and a set of radio network controllers.

In addition, backhaul link(s) 151 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links that can include terrestrial air-interfaces or deep space links (e.g., satellite communication links for navigation). In an aspect, for UMTS-based networks, backhaul link(s) 151 can embody an IuB interface. In another aspect, for Evolved Packet System (EPS) network, backhaul link(s) 151 can embody an S1/X2 interface.

Figure 2:
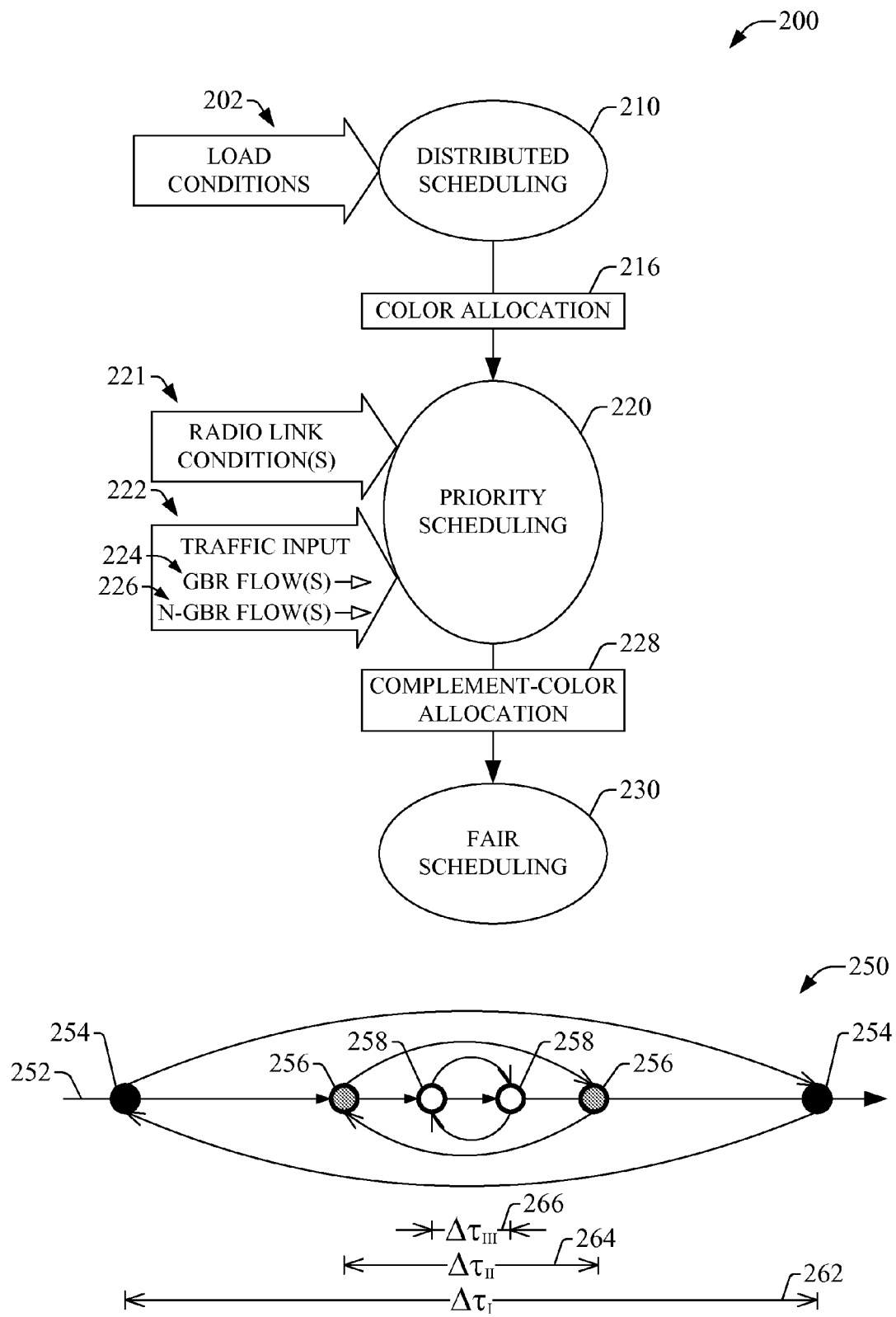
FIG. 2 displays diagrams that illustrate multi-phase scheduling logic in accordance with aspects described herein.

FIG. 2 displays diagrams that illustrate multi-stage scheduling logic in accordance with aspects described herein. Details of scheduling stages and embodiments of system(s) that can implement such multi-stage scheduling are described in connection with FIGS. 3-12. As discussed below, the multi-stage scheduling can be implemented in frequency-time domain and is termed herein chromatic scheduling, in that radio resources are cast and administered in terms of colors and associated color saturation and color luminance. One or more functional elements that implement such chromatic scheduling are termed herein chromatic scheduler. Load condition(s) 202 for a set of one or more base stations, wherein each base station in the set serves one or more sectors, can be supplied to a scheduler (not shown in FIG. 2), or scheduler component, that performs distributed scheduling 210 as first-stage scheduling. Distributed scheduling 210 allows allocation of frequency resources, e.g., portion(s) of electromagnetic (EM) radiation spectrum available to a telecommunication carrier that manages the set of base stations for telecommunication. In an aspect of the subject disclosure, allocated frequency resources can be subdivided into "colors," wherein in color represents a subset of the total available frequency resources for telecommunication. Colors and frequencies can be related through a fixed or variable relationship according to pre-defined and synchronized hopping sequences exploited by all or substantially all base stations within the set of one or more base stations. In an illustrative scenario, a network node, or component(s) therein, that reside in mobile network platform(s) 108 can utilize historical or current or nearly current measured traffic to generate, e.g., calculate, an initial suitable frequency resource configuration, e.g., a distribution of "preferred colors," or allocations of frequency resources, amongst cells or sectors served by respective base stations. Such distribution of preferred colors can represent a default template for frequency resource allocation. Default template(s) can be specific to a cell or sector or particular service periods; for example, the network node, or component(s) therein, can generate a default template for voice busy hour in a highway-crossing or downtown area.

Distributed scheduling 210 can produce a color allocation 216 for each base station in the set of base stations that can achieve a satisfactory network capacity, which can be optimal or nearly optimal. The scheduler, or scheduler component, that implements the distributed scheduling 210, can utilize the distribution of preferred colors as an initial color allocation, which can be further iterated, e.g., adjusted, to produce the color allocation 216 and to compensate for time-dependent variations in load condition, interference, or other radio link changes, associated with the set of one or more base stations. In an aspect, the scheduler, or scheduler component, can execute (e.g., via at least in part a processor) a distributed fixed point algorithm (e.g., retained in a memory) to generate color allocation 216 through iteration of an initial color allocation, e.g., preferred color distribution. Color allocation 216 for the set of base stations can be retained in a resource exclusion list (REL). In an aspect, a REL can convey a partition of electromagnetic radiation spectrum available to the telecommunication carrier that administers the set of base stations, recording allocation(s) of spectrally disparate frequency resources, or color(s), to each base station in the set of base stations.

At least for high-priority traffic, e.g., guaranteed-bit-rate (GBR) traffic, such allocation of frequency resources, or color allocation 216, can be directed to increase capacity of the set of base stations through reduction of inter-cell or inter-sector interference. As described below, at least a portion of frequency resources in color allocation 216 that are insufficient for transport, or delivery, of high-priority traffic, can be deemed non-preferred color allocation and can be assigned to low priority traffic, e.g., non-GBR traffic, overflowed high-priority traffic, or traffic in coverage areas without significant mutual interference amongst serving cells or sectors.

Color allocation 216 can be supplied to a scheduler (not shown in FIG. 2), or scheduler component, that can conduct priority scheduling 220 as second-stage scheduling. Such scheduling can incorporate at least one of radio link condition(s) 221 or traffic input 222, which can include GBR flow(s) 224, also referred to as GBR traffic flow(s) 224, and non-GBR flow(s) 226, also referred to as n-GBR traffic flow(s), and can allocate frequency-time resources, e.g., physical resource blocks in 3GPP LTE based technology, in accordance at least in part with estimated available capacity in a set of frequency-time resources for a specific base station and service requirements of GBR flow(s) 224. Available frequency-time resources for allocation can be constrained in part by color allocation 216. Allocation of frequency-time resources in second-stage scheduling can include generation of a first set of frequency-time resources, which can be included in a resource reservation list (RRL) for GBR traffic flow(s) 224 and the REL, and a second set of frequency-time resources that can be included in a complementary RRL (CRRL) that can allocate frequency-time resources for n-GBR traffic flow(s) 226. Conventional priority queuing (PQ) technique(s) can be employed to schedule transmission of one or more flows in GBR traffic flow(s) 224.

CRRL can be complementary to RRL in that the CRRL can include frequency-time resources that are part of the color allocation 216 for the base station, but have insufficient bit rate throughput (due, for example, to poor radio link quality) to support transmission of GBR packets, which are part of GBR traffic flow(s) 224, in accordance with pre-determined requirements. Accordingly, in addition to scheduling GBR traffic flow(s) 224, second-stage scheduling or priority scheduling 220 can produce a complement-color allocation 228 that can be conveyed to a scheduler, or scheduler component, that can effect fair scheduling 230 as third-stage scheduling of non-GBR traffic flow(s) 226 and re-transmission of data packets that compose such traffic.

Scheduling stages can be repeated periodically as illustrated in diagram 250; arrows that connect disparate points in delay timeline 252 represent such periodicity. It should be appreciated that reiteration of a scheduling stage can lead to reiteration of subsequent scheduling stage(s). First-stage scheduling, represented with solid circle(s) 254, has a period $\Delta\tau_I$ 262 that is longer than period $\Delta\tau_{II}$ 264 of second-state scheduling, represented with grey circle(s) 256, which in turn is longer than period $\Delta\tau_{III}$ 266 of third-state scheduling, represented with open circle(s) 258. In an aspect, $\Delta\tau_I$ 262 can be two orders of magnitude longer than $\Delta\tau_{II}$ 264, which can be one order of magnitude longer than $\Delta\tau_{III}$ 266: As an example, $\Delta\tau_I$=60 s; $\Delta\tau_{II}$=20 ms; and $\Delta\tau_{III}$=1 ms. Time scale of period of each scheduling stage described herein can be dictated, at least in part, by at least one of time scale of changes in input information utilized to allocate radio resources and to schedule traffic, or computational cost to perform the scheduling stage. In an aspect, distributed scheduling 210 can be the most computation intensive, including collection or exchange of load condition(s) of a plurality of base stations and analysis of a significant manifold of frequency and power allocation, particularly for small (e.g., 1.25 KHz) sub-carrier spacing and large portions of available EM radiation spectrum (also termed herein available spectrum). In another aspect, changes in load condition(s) within a served sector or cell can occur over longer time scale(s) than changes to service requirement for queued traffic. Accordingly, $\Delta\tau_I > \Delta\tau_{II}$. Similarly, to increase likelihood of successful delivery of data packets in n-GBR traffic 226, $\Delta\tau_{II} > \Delta\tau_{III}$ allows various re-transmission attempts of such data packets and adjustment of traffic load that result from served n-GBR, e.g., best effort, data packets.

In an aspect of the subject disclosure, magnitude of at least one of $\Delta\tau_I$, $\Delta\tau_{II}$, or $\Delta\tau_{III}$ can be configured statically or dynamically. Static configuration can be effected by a network administrator. Dynamic configuration can be performed automatically in accordance with a predetermined set of criteria, such as magnitude and rate of changes in load condition(s) 202, traffic input 222, or radio link quality, as determined from radio link condition(s) 221 (e.g., CQI report(s), MCS indicator(s), signal strength data . . . ). In addition or in the alternative, dynamic configuration can be conducted autonomously based at least in part on analysis of temporal and spatial patterns of load condition(s) 202 in the set of base stations or network performance resulting from at least color allocation 216 or complement-color allocation 228. Dynamic configuration of scheduling period(s) also can be implemented based on cost-utility trade-off amongst scheduling costs (e.g., collection of load condition(s) 202, signaling level of delivery of load condition(s) information or scanning of available traffic flow(s) . . . ), which can be incurred at each instance of a scheduling stage, and benefit of allocating radio resources and traffic in accordance at least in part with updated load condition(s) and traffic input.

Periodic or iterative implementation of the scheduling stages can enable optimization or nearly-optimization of network capacity through periodic or iterative update of radio resource allocation(s) and schedule(s) that are based at least in part on updated load condition(s) in one or more served sectors. Reiteration of first-stage scheduling 254 can afford re-packing, or redistribution, of frequency radio resources in color allocation 216 in response to changes in load condition(s) in a set of one or more served sectors, e.g., change in traffic or change in inter-cell interference levels in one or more sectors. In an aspect, re-generation of a color allocation 216 for a set of base stations can be implemented even in scenarios in which a base station within the set of base stations is failing. Re-packing of radio-resources can warrant re-generation of RRL and CRRL, which can be afforded by reiteration of second-stage scheduling. It should be appreciated that such reiteration allows for acquisition of updated traffic input 222, and associated GBR flow(s) 224 and n-GBR flow(s) 226. Updated RRL and CRRL can enable re-scheduling of both GBR flow(s) 224 and n-GBR flow(s) 226 as traffic is served. In addition, substantially shorter period $\Delta\tau_{III}$ with respect to $\Delta\tau_{II}$ can allow efficient scheduling of re-transmission of n-GBR, e.g., best effort, packet(s).

The multi-stage, nested scheduling described herein and enabled by the system(s) described below, can provide at least the following advantages with respect to conventional approaches to scheduling of traffic flow(s) with strict service requirements: (i) Distributed scheduling 210 can ensure that interference to a traffic loaded base station can be minimized, thus network capacity can be optimized or nearly-optimized. (ii) Priority scheduling 220 can ensure that traffic flow(s) that demand strict service requirements or quality of service (QoS), such as voice traffic or audiovisual media content, can have requirements fulfilled. (iii) Through scheduling of non-GBR traffic in a shorter scheduling period, re-transmission of data packets and recovery of unused radio resources allocated to GBR traffic flow(s) can be allowed.

Figure 3:
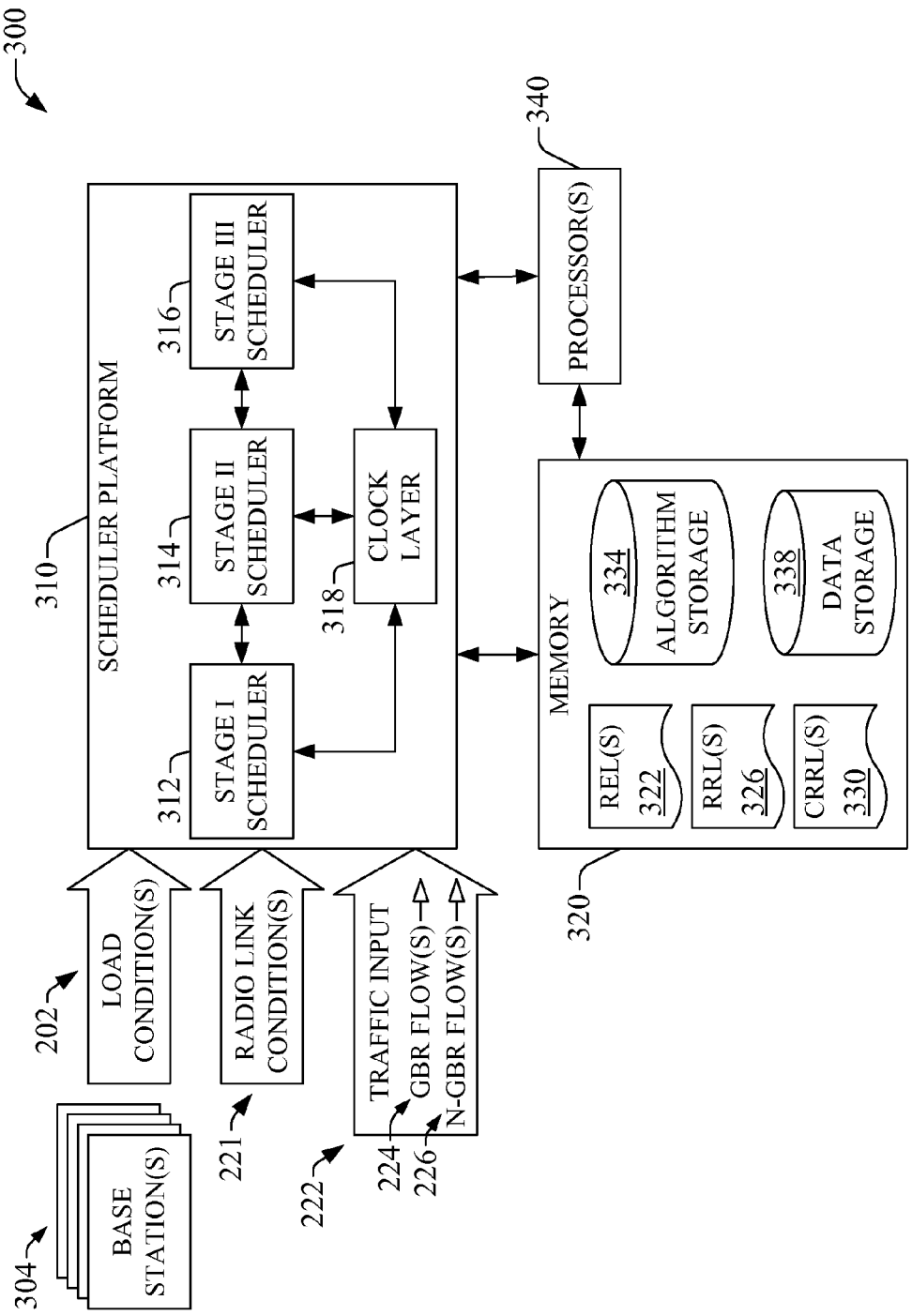
FIG. 3 is a block diagram of an example system that enables multi-stage scheduling logic in accordance with aspects described herein.

FIG. 3 is a block diagram of an example system 300 that enables multi-stage scheduling logic in accordance with aspects described herein. To implement distributed scheduling 210, scheduler platform 310 can receive load condition(s) 202 for a set of one or more base stations. A stage I scheduler component 312, also referred to herein and the annexed drawings as stage I scheduler 312, can analyze a set of frequency resources and power allocations in order to optimize capacity of the set of base stations. To speed-up convergence of such optimization, stage I scheduler 312 can exploit an initial color allocation, e.g., an initial set of frequency resources, as an initial operating point. At least one of a network node, or component(s) therein, or stage I scheduler 312 can produce, e.g., compute, such initial color allocation prior to optimization of capacity of the set of base stations. As described supra, the initial color allocation can represent a default template for frequency resource allocation; a default template can be specific to a cell or sector or particular service periods, e.g., the default template can be previously computed for voice busy hour in a highway-crossing or downtown area.

In an aspect, stage I scheduler 312 can search frequency and power allocations that minimize inter-cell interference; the frequency and power allocations can define a color allocation for each base station in the set of base stations, wherein the color allocation can establish a color saturation and color luminance. Color saturation can determine spectral width of allocated resources for a base station and color luminance can establish a transmit power for at least a portion of the allocated resources; in an aspect, in one or more embodiments, color luminance can be adjusted for an individual PRB or sets of PRBs within the spectral bounds of allocated color saturation. Stage I scheduler 312 can pursue a search strategy in which neighboring base stations have disparate colors with saturation that suits relative capacity yet minimizes spectral overlap amongst the neighboring base stations, at least for high-priority traffic flow(s). In addition, color luminance can be determined so as to provide optimal or nearly optimal cell or sector performance yet mitigate inter-cell interference, particularly for traffic, e.g., high-priority traffic, at loaded base station(s) in the set of base stations. The initial operating point for color allocations can be based on simulation of network capacity for the set of base stations for disparate color allocations. Stage I scheduler 312 can terminate a search for a color allocation if an estimated, e.g., simulated, capacity for the set of base station satisfies predetermined criteria; such criteria (not shown) can be retained in data storage 338.

Additionally, stage I scheduler 312 can generate a color allocation, including generation of initial operating point(s), based at least in part on at least one of an actual network configuration or network performance measurement(s). Such network performance measurements can include handover counts, user equipment reports on data of served versus interfering signal levels, CQI-specific traffic data, or the like. Combinations of the foregoing network performance measurements or other indications of potential mutual interference between cell or sector carriers can be part of network performance data employed by stage scheduler 312 to generate the color allocation. Through incorporation of network performance data in determination of the color allocation, the objective of scheduler platform 310 can be to ensure, at least in part, that cells or sectors with the most mutual interference utilize different colors, e.g., frequency resources, for the highest priority traffic, e.g., GBR-traffic, in coverage areas wherein the cells or sectors affect each other's performance through interference. Moreover, cells or sectors with the most high priority traffic, e.g., GBR traffic, can have the most color saturation in a color allocation.

Figure 4:
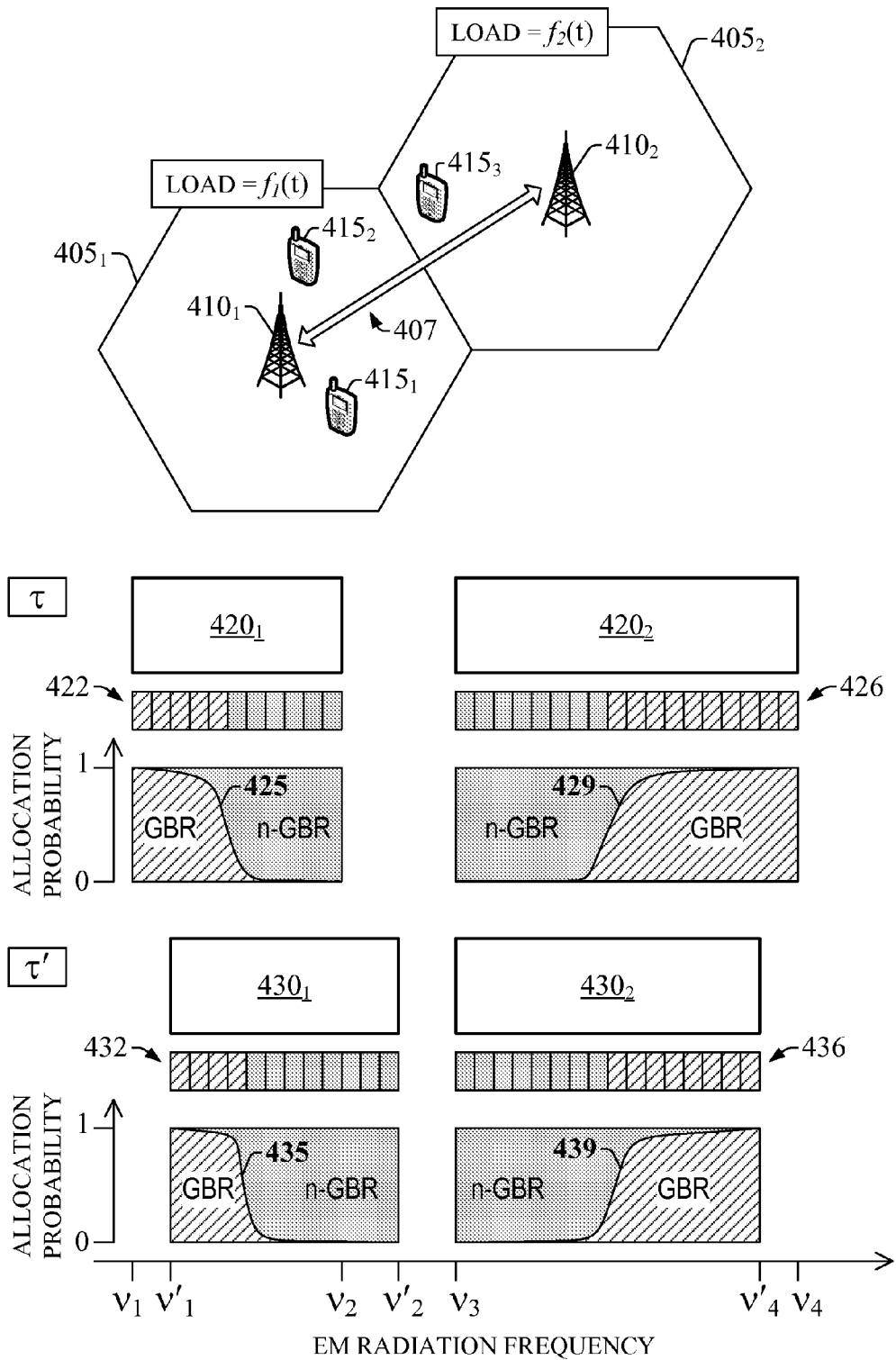
FIG. 4 presents an illustration of color allocation for two neighboring cells in accordance with aspects described herein.
Figure 5:
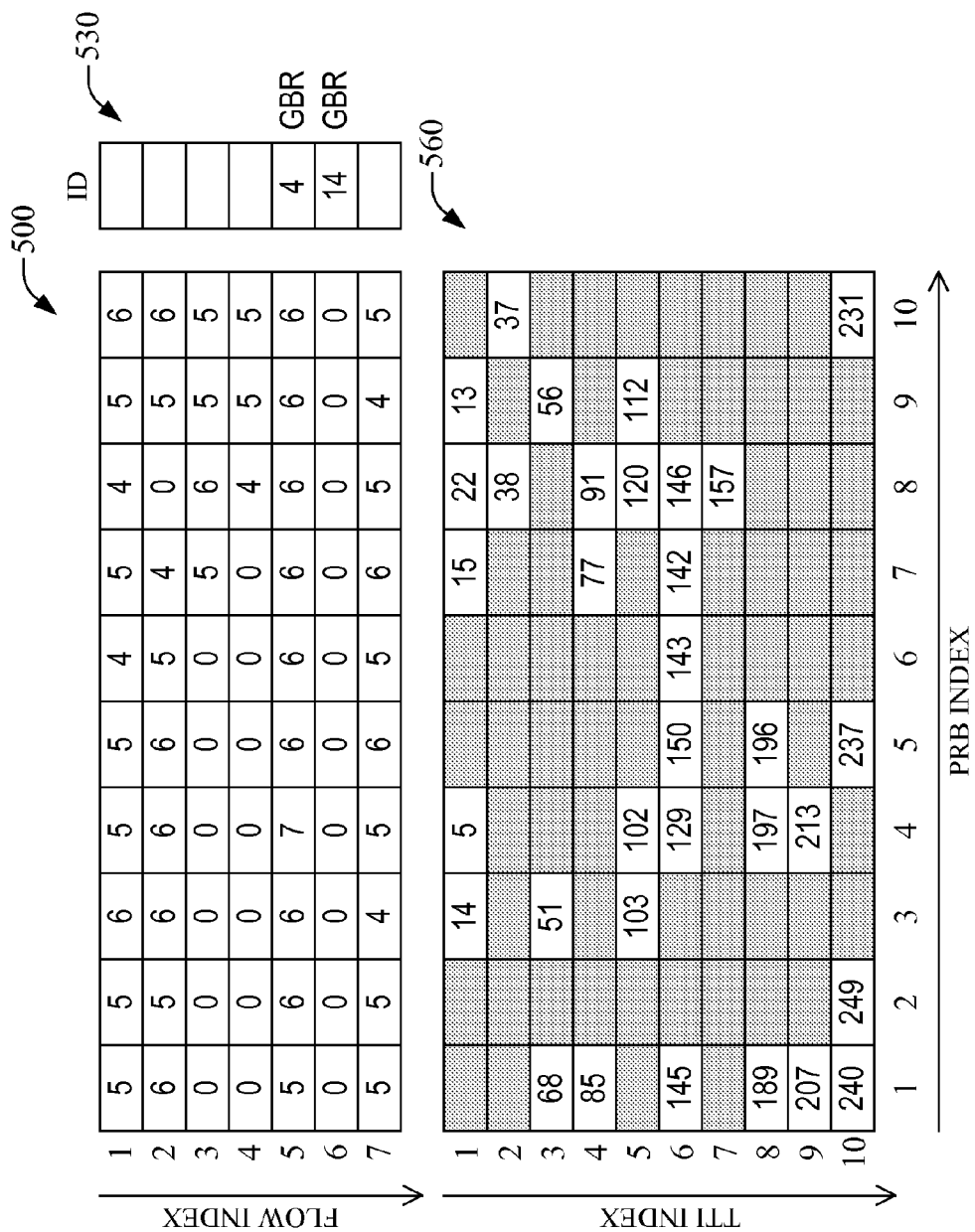
FIG. 5 displays diagrams of channel quality indicators (CQIs) for a set of traffic flows, and a portion of an illustrative allocation of physical resource blocks for high-priority traffic and low-priority traffic in accordance with aspects herein.
Figure 6:
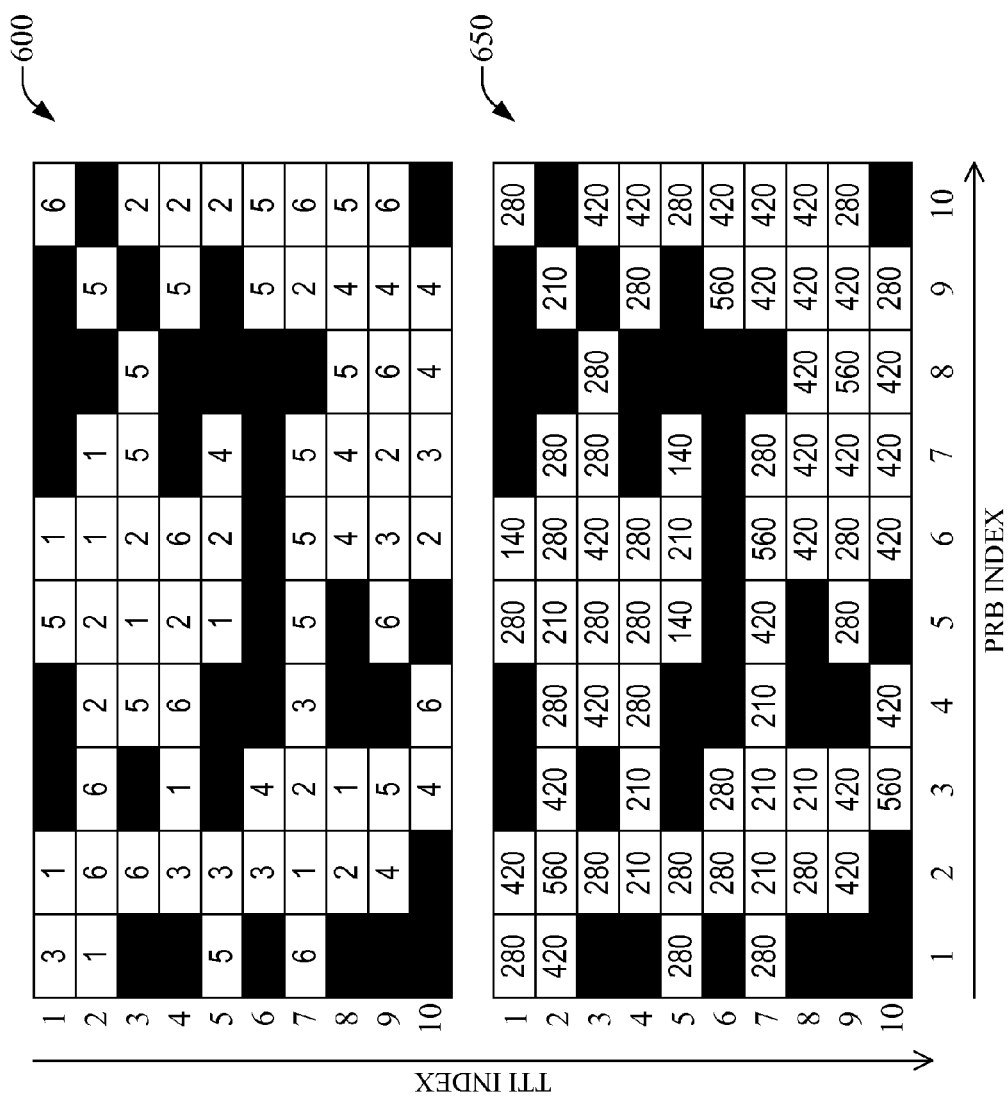
FIG. 6 presents diagrams for CQIs and at least a portion of a schedule realization for a set of PRBs allocated for low-priority traffic transport in accordance with aspects described herein.

As described supra, based on the color allocation, stage I scheduler 312 can generate a REL that can conveys color saturation and color luminance for the set of base stations. The REL can be retained in memory element REL(s) 322. Methodologies to search for suitable color allocation(s) for a base station can be retained in algorithm storage 334. As an illustration, FIG. 4 presents a color allocation for two neighboring cells $405_1$ and $405_2$, with loads characterized through functions $f_1(t)$ and $f_2(t)$, respectively. In the illustration in FIG. 4, cells $405_1$ and $405_2$ can be served, respectively, by base stations $410_1$ and $410_2$; such base stations can be functionally connected via backhaul pipe(s) 407 (see also FIG. 1). At a time τ, cells $405_1$ and $405_2$ can be allocated blocks of frequency resources $420_1$ and $420_2$, respectively. Blocks $420_1$ and $420_2$ can be colors characterized, respectively, by saturations $v_2-v_1$ and $v_4-v_3$. Saturation of color represented by block $420_2$ can be larger than saturation for color of block $420_1$ to reflect, for example, larger load in cell $405_2$. At time τ', stage I scheduler 312 can generate a disparate color allocation that can reflect variations in cell loads or in other network performance metrics, wherein cell $405_1$ can be allocated a block of frequency resources $430_1$ with saturation $v'_2-v'_1$, and cell $405_2$ can be allocated a block of frequency resources $430_2$ with saturation $v'_4-v'_3$, with $v'_3=v_3$.

For the set of base stations, stage I scheduler 312 can supply a color allocation, which can include color saturation and color luminance, to stage II scheduler component 314, also referred to herein and annexed drawings as stage II scheduler 314, which can implement priority scheduling 220 as described supra. Such color allocation can be a preferred color allocation determined as described hereinbefore. In an aspect, for each base station in the set of base stations that provides input to load condition(s) 202, a received color allocation can be discriminated in accordance with physical resource blocks, which are frequency resources that can span a set of frequency sub-carriers with a specific bandwidth during a transmission time interval. Stage II scheduler 314 can acquire, via, for example, a collection component (not shown) a CQI estimate and associated modulation and coding scheme (MCS) for each PRB allocated to a predetermined base station as established in the supplied REL; in an aspect, the predetermined base station can be that which hosts scheduler component 310. The CQI estimate and associated MCS can be acquired as part of radio link condition(s) 221, which can be received from one or more user equipment. In the alternative or in addition, the CQI estimate and associated MCS can be acquired through assessment of a radio link quality metric based at least on channel quality data that can be measured by the one or more user equipment and received as part of radio link condition(s) 221. As an illustration, diagram 500 in FIG. 5 displays CQI estimates for a set of PRBs that are part of an example REL and for a set of traffic flows. Numerical indices associated with each represented PRB (a sketched rectangle in FIG. 5) can convey the respective CQI estimate; higher values can indicate higher radio channel quality, and a null value can represent a PRB with insufficient CQI to transport high-priority traffic.

Based on the acquired CQIs and associated MCSs, stage II scheduler 314 can compute flow capacity for the color allocation associated with the predetermined base station and determine an effective bit rate that can be transported for each PRB. In an example, the flow capacity and the effective bit rate can be established in Kbps. In an aspect, flow capacity for a PRB can be computed or determined based on Kaufman-Roberts recursion for GBR traffic flow(s) 224 and non-GBR traffic flow(s) 226. It should be appreciated that other approximation(s) or formalism(s) can be employed to determine flow capacity for the PRB; variation(s) of Kaufman-Roberts recursion also can be employed to establish the flow capacity for the PRB. It should be further appreciated that flow capacity in stage II scheduling, or priority scheduling, can be determined as a bit rate q, e.g., q Kbps, since service requirements of GBR traffic, e.g., GBR flow(s) 224, can be expressed in terms of committed information rates (CIR). Accordingly, scheduler platform 310, via, for example, stage II scheduler 314, can perform MCS time filtering to estimate an effective bit rate, or bit rate metric, for the duration of a call session in order to mitigate, e.g., minimize, signaling to a mobile device that initiates and maintains the call session.

Stage II scheduler 314 can acquire traffic input 222, which can include GBR flow(s) 224 and non-GBR flow(s) 226. Acquisition can be non-local (as illustrated in diagram 300), wherein stage II scheduler 314 can convey an indication to a network node (e.g., a mobility management entity (MME)) to deliver queued traffic for the base station including stage II scheduler 314. Alternatively, acquisition can be local, wherein stage II scheduler 314 can poll a queue (not shown) in data storage 338 to determine volume of GBR and n-GBR data available data packets that compose GBR traffic flow(s) 224 and n-GBR traffic flow(s) 226. As illustration, diagram 530 in FIG. 5 indicates two GBR flows for user equipment with identities (IDs) 4 and 14. Based on acquired GBR traffic flow(s) 224, stage II scheduler 314 can generate at least one of an RRL or a CRRL, and retain at least one of RRL or CRRL in memory element 326 or 330. To produce the RRL, stage II scheduler 314 can match bit requirements for acquired GBR data flows with computed bit rate capacity for the PRBs in the color allocation available to the base station for which the GBR traffic flow(s) 224 is available. To produce CRRL, stage II scheduler 314 can allocate PRBs that are part of the color allocation for the base station for which RRL is configured and do not provide suitable radio link quality or associated MCS. Thus, PRBs indicated in CRRL can transport at least a portion of data packets that compose non-GBR traffic flow(s) 226. In diagram 560 in FIG. 5, open blocks represent PRBs that are part of a generated RRL, wherein, as described supra, numerical indices in each open block can convey a bit rate that respective PRBs can support or transport. A set of 10 transmission time intervals (TTIs) is illustrated in diagram 560. Based on radio resources reserved in RRL, stage II scheduler 314 can schedule GBR traffic flow(s) 224 based on priority queuing (PQ), whereas scheduling of non-GBR traffic flow(s) 226 can be based on fair scheduling 230. Methodologies to implement PQ can be retained in algorithm storage 334.

In an example scenario such as the one illustrated in FIG. 4, blocks 422 and 426 sketch an RRL and CRRL for frequency resource blocks, or colors, $420_1$ and $420_2$. In blocks 422 and 426, dashed rectangles can represent allocated resources for GBR traffic, e.g., GBR flow(s), while grey rectangles can represent resources allocated to n-GBR traffic, e.g., n-GBR flow(s) 226. Likewise, for color allocation at time τ', blocks 432 and 436 can represent RRL and CRRL allocations. As illustrated, stage II scheduler 314 can produce allocation(s) in which spectral separation amongst frequency resources for high-priority traffic (e.g., GBR flow(s) 224; dashed rectangles) is larger than spectral separation between frequency resources assigned to low-priority traffic (e.g., n-GBR flow(s) 226; grey area) in order to reduce effects of mutual interference amongst cell $405_1$ and $405_2$ in transport of GBR traffic. Such mutual interference can be caused by telecommunication (e.g., wireless delivery or wireless reception) of traffic (e.g., user data, or control data or signaling) associated with user equipment $415_1$, $415_2$ and $415_3$.

In addition or in the alternative, color allocation at time τ can result from a reduction in high-priority traffic in at least one of cell $405_1$ or $405_2$; for instance, UE $415_1$ and UE $415_3$ can terminate call sessions that consume (e.g., transmit or receive) GBR traffic. As illustrated, reduced high-priority traffic from instant τ to instant τ' can lead to reduced spectral separation amongst frequency resources allocated in blocks $430_1$ and $430_2$, and reduced levels of frequency resources with respect to allocation at time τ. It should be appreciated that the resources granted to a cell or sector in a color allocation can be made available for user equipment that operates in the cell or sector. As indicated supra, dashed rectangles represent allocation of frequency resources for user equipment that transmit and receive high-priority traffic, and grey-area rectangles represent resources allocated for user equipment that transmits and delivers low-priority traffic.

In an aspect, scheduler 310, or component(s) therein (e.g., stage II scheduler 312), can allocate frequency resources in accordance with an allocation probability profile, which can determine, at least in part, a blocking probability for assignment of a frequency resource to a specific call class, e.g., high-priority traffic call or low-priority traffic call. In an example scenario, Kaufman-Roberts algorithm can be employed to determine the blocking probability and thus a satisfactory (e.g., optimal or nearly-optimal) PRB allocation. At instant τ, allocation probability profile 425 can lead, for example, to allocation realization shown in block 422, while allocation probability profile 429 can result, for example, in allocation displayed in block 426. As indicated supra, if traffic in at least one of cell $405_1$ or $405_2$ is reduced from instant τ to instant τ', probability allocation profiles 435 and 439 can display a smaller probability for a larger portion of available frequency resources in blocks $430_1$ and $430_2$, respectively.

In an aspect of the subject disclosure, in operational scenarios in which Physical Downlink Shared Channel (PDSCH) power control is employed, e.g., by a base station, PDSCH attenuation can be factored in, or included, in the determination of overall chromatic priority, or probability profile(s), to produce a satisfactory (e.g., optimized or nearly-optimized) PRB allocation. In an aspect, user equipment with higher PDSCH attenuation can have a lower chromatic priority than user equipment that operates at full PDSCH transmit power.

Stage III scheduler component 316, also referred herein and in the annexed drawings as stage III scheduler 316, can perform fair scheduling 230. To at least that end, in an aspect, stage III scheduler 316 can acquire CQI and allowable MCS per PRB for the set of PRBs conveyed in CRRL, which are PRBs allocated for non-GBR traffic. If current or nearly current load condition(s) determined from such acquisition requires additional radio resources, e.g., PRB(s), to transport the non-GBR traffic flow(s) 226, stage III scheduler 316 can unmask a set of non-committed PRBs listed in RRL(s) 326; non-committed PRBs are those resources not scheduled to transport a data packet. To unmask a PRB, stage III scheduler 316 can logically remove, e.g., through a tag, the PRB from the RRL and allocate the PRB for transport of non-GBR traffic data packet(s). Based on allocated PRBs, including the set of unmasked PRBs, stage III scheduler 316 can schedule transmission of non-GBR traffic in accordance with fair queuing, e.g., weighted fair queuing (WFQ); methodologies to implement fair queuing can be retained in algorithm storage 334. Accordingly, a scheduled transmission can be substantially random and based primarily in CQI estimates. Diagram 600, in FIG. 6, displays acquired CQI for a set of PRBs, and a respective set of TTIs, wherein black rectangles indicate PRBs that are granted for high-priority traffic transport (see, e.g., FIG. 5); the set of PRBs is the same as the set of PRBs illustrated in diagram 560. Diagram 650 presents a transmission schedule for the set of PRBs, and respective TTIs, included in diagram 600; numerical indices convey scheduler bit-rate capacity for respective PRBs.

Figure 7:
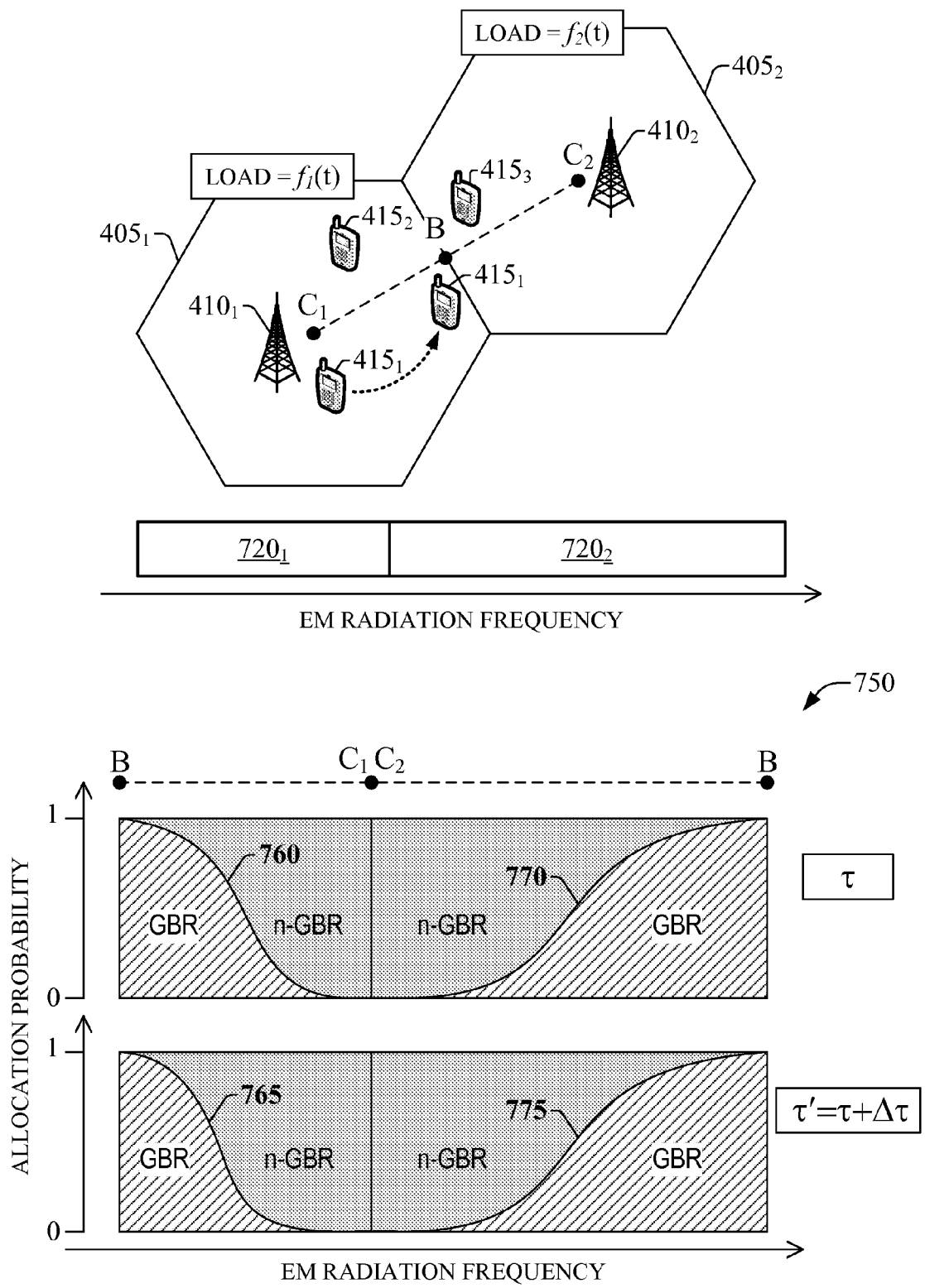
FIG. 7 displays an example color allocation and assignment of frequency resources to high-priority and low-priority traffic for disparate coverage cells in accordance with aspects of the subject disclosure.

As an illustration, FIG. 7 displays an example color allocation and assignment of frequency resources to high-priority and low-priority traffic for coverage cells $405_1$ and $405_2$. The color allocation can include frequency blocks $720_1$ and $720_2$, which can be spectrally adjacent. As described supra, saturation for block $720_2$ can be larger because of larger load level (e.g., larger value of function $f_2$) in cell $405_2$. Diagram 750 displays two illustrative sketches of resource allocation probability profiles that scheduler platform 310, or components therein, can produce for disparate times (τ and τ') and frequency resource blocks $720_1$ and $720_2$ in accordance with multi-stage scheduling described herein. In diagram 750, $C_1$ and $C_2$ indicate, respectively, center of cell 4051 and 4052, while B indicates the point at cell boundary that is intersected by a straight line connecting centers $C_1$ and $C_2$. At a first time τ, for load conditions determined in part by $f_1(\tau)$ and $f_2(\tau)$, allocation probability $P_{GBR}$ of frequency resources for high-priority traffic, or GBR traffic, in block $720_1$ obeys a profile 760, while in block $720_2$, $P_{GBR}$ can be determined by profile 770. Allocation probability of frequency resources for low-priority traffic, or n-GBR traffic, can be determined by $P_{n-GBR}=1-P_{GBR}$. As illustrated in diagram 750, and indicated supra, scheduler platform 310, or components therein (e.g., stage II scheduler 312), can generate an allocation of frequency resources that increases spectral separation of frequency resources granted to high-priority traffic in different coverage cells. At a second time τ', load conditions in coverage cells $405_1$ and $405_2$ and mutual interference amongst such coverage cells can change and scheduler platform 310, or components therein (e.g., stage I scheduler 312 or stage II scheduler 314), can update allocation probability of resources granted for traffic within cells $405_1$ and $405_2$. Such update is herein termed repacking and can be characterized by adjusted allocation probability profiles, e.g., 765 and 775. It should be appreciated that, based on time-scale, re-packing also can include adjustment of color allocation; for instance, every period $\Delta\tau_r$ 262 can result in repacking of frequency-time resources due to color allocation re-generation.

In a particular, illustrative scenario, changes in load and mutual interference conditions can result from mobility of user equipment from cell-center operation to cell-edge operation. In an aspect, cell-center operation can be characterized by UE low transmit power and high path loss relative to neighboring cells, whereas cell-edge operation can be characterized by high transmit power (e.g., a predetermined substantial fraction of maximum allowed transmit power for UE) and low path loss relative to neighboring coverage cells. Accordingly, to mitigate inter-cell interference resulting from mobility of UE $415_1$ that results in a transition from cell-center to cell-edge operation, repacking produced by scheduler platform 310, or components therein (e.g., stage II scheduler 314 and stage III scheduler 316), can increase spectral separation amongst frequency resources granted for high-priority traffic in cells $405_1$ and $405_2$. In view of spectral separation of frequency resources granted to high-priority traffic, traffic exchange between a mobile device, such as $415_3$, that operates in the vicinity of the edge of coverage cell $405_2$ can be protected, at least in part, from interference that can be caused by displacement of UE $415_1$ towards the edge of cell $405_1$.

In one or more operational scenarios in which PDSCH power control can be effected, user equipment that consumes high-priority traffic (e.g., VoIP traffic) can contribute different interference costs per PRB based at least in part on dynamic power allocated to the PDSCH. With respect to multi-stage scheduling, or chromatic scheduling, described herein, UE that consume high-priority traffic (e.g., VoIP traffic) at cell center can utilize less power per PDSCH PRB, create less interference on disparate UE, and therefore can require lower priority than cell edge UE with full PDSCH power.

In particular, in an aspect, PDSCH-attenuated cell-center UE that consume high-priority traffic (e.g., VoIP or other GBR traffic) can require lower priority than non-attenuated cell-center UE that consumes low-priority (e.g., best-effort or other n-GBR traffic) with MCS that includes M-ary QAM (quadrature amplitude modulation), with M a natural number. Accordingly, repacking of frequency-time resources as implemented by scheduler platform 310, or components therein (e.g., stage II scheduler 314 and stage III scheduler 316), can afford to allocate such PDSCH-attenuated cell-center UE that consume high-priority traffic to PRB(s) which, for example, are co-channel with the primary color of a neighboring cell, e.g., block $720_2$. However, for substantially the same conditions (e.g., PDSCH power control), the repacking can avoid allocation of such PRB(s) to cell-center UE that consumes low-priority traffic (e.g., best-effort traffic or other n-GBR traffic) with M-ary QAM at full power.

Figure 8:
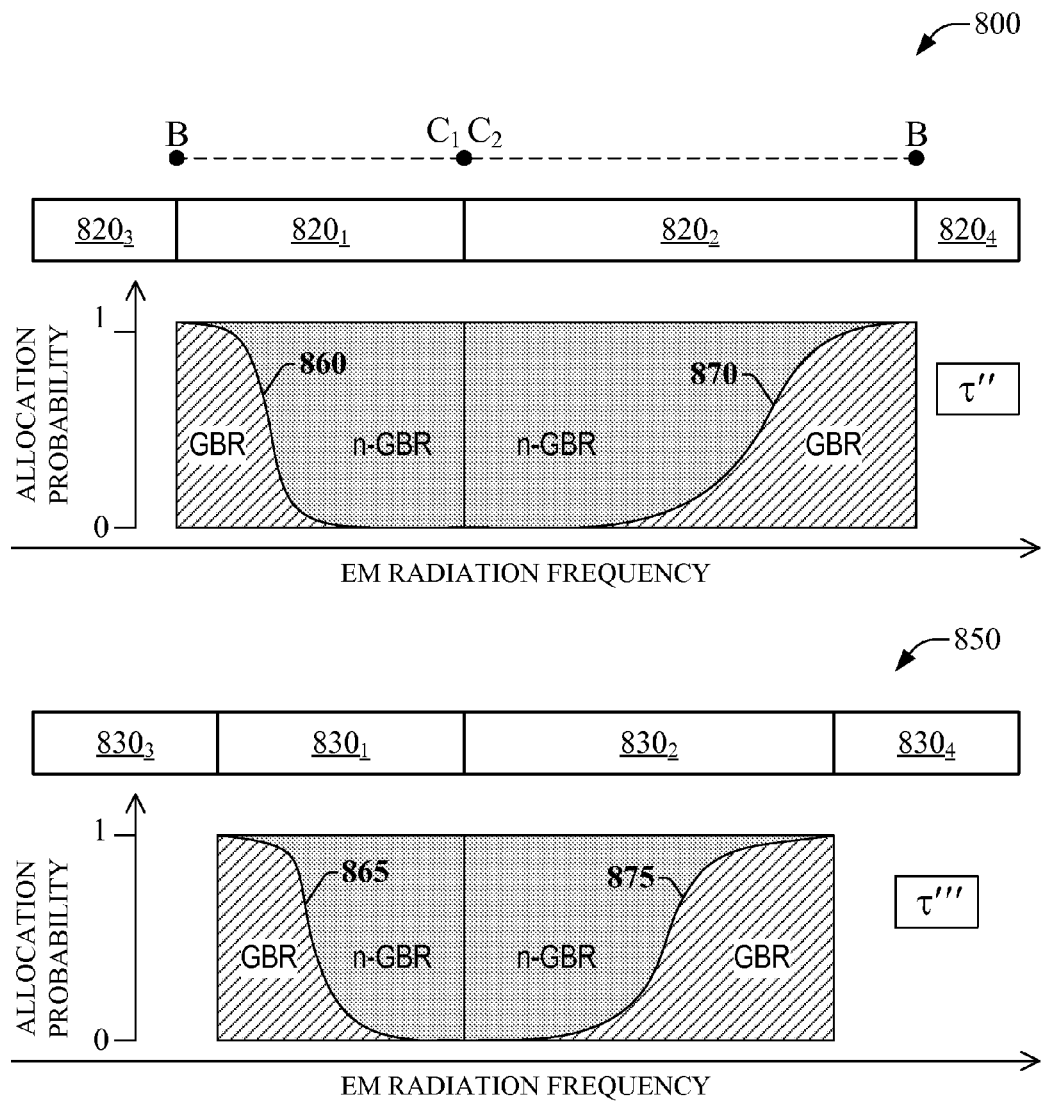
FIG. 8 displays example allocations of frequency resources that exploit surplus of frequency resources to mitigate limitation(s) in network performance in accordance with aspects described herein.

With respect to repacking, scheduler platform 310, or components therein (e.g., stage II scheduler 314), can adjust granted resources for high-priority traffic (e.g., GBR flow(s) 224) and low-priority traffic (n-GBR flow(s) 226) in response to load changes originating from changes in traffic, e.g., GBR flow(s) 224. In an aspect, such adjustment can mitigate surplus of frequency resources assigned to low-priority traffic, as represented in FIG. 8. In an example scenario, at instant $\tau''$, a first color allocation of frequency resources, e.g., frequency blocks $820_1$ and $820_2$, illustrated n diagram 800, can result in an assignment of frequency resources, e.g., profiles 860 and 870, for high-priority traffic that presents a surplus of frequency resources in view of low high-priority traffic in one or more of cells $405_1$ or $405_2$. In addition, the first color allocation (diagram 850) includes frequency blocks $820_3$ and $820_4$. As illustrated, the surplus of frequency resources can be represented by a substantive allocation of such resources to low-priority traffic, which in view of the finite amount of frequency resources available to a telecommunication carrier, can lead to network performance degradation related to non-optimal or limited frequency resources allocation for traffic in coverage cells other than cells $405_1$ and $405_2$, e.g., coverage cells associated with frequency blocks $820_3$ and $820_4$.

To assign resources to the high-priority traffic more effectively, scheduler platform 310, or components therein, can adjust, via implementation of multi-stage scheduling described herein, the first color allocation and the assignment of frequency resources to reduce available surplus of frequency resources and thus improve overall network performance. As illustrated, at time $\tau'''$, a second color allocation, e.g., frequency blocks $830_1$ and $830_2$, illustrated in diagram 850, can span a lesser number of frequency resources, while profiles 865 and 875 of allocation probability for high-priority traffic can assign lesser resources to low-priority traffic. In addition, as part of adjustment to the initial color allocation, blocks $830_3$ and $830_4$ (diagram 850) can be assigned increased saturation.

Figure 9:
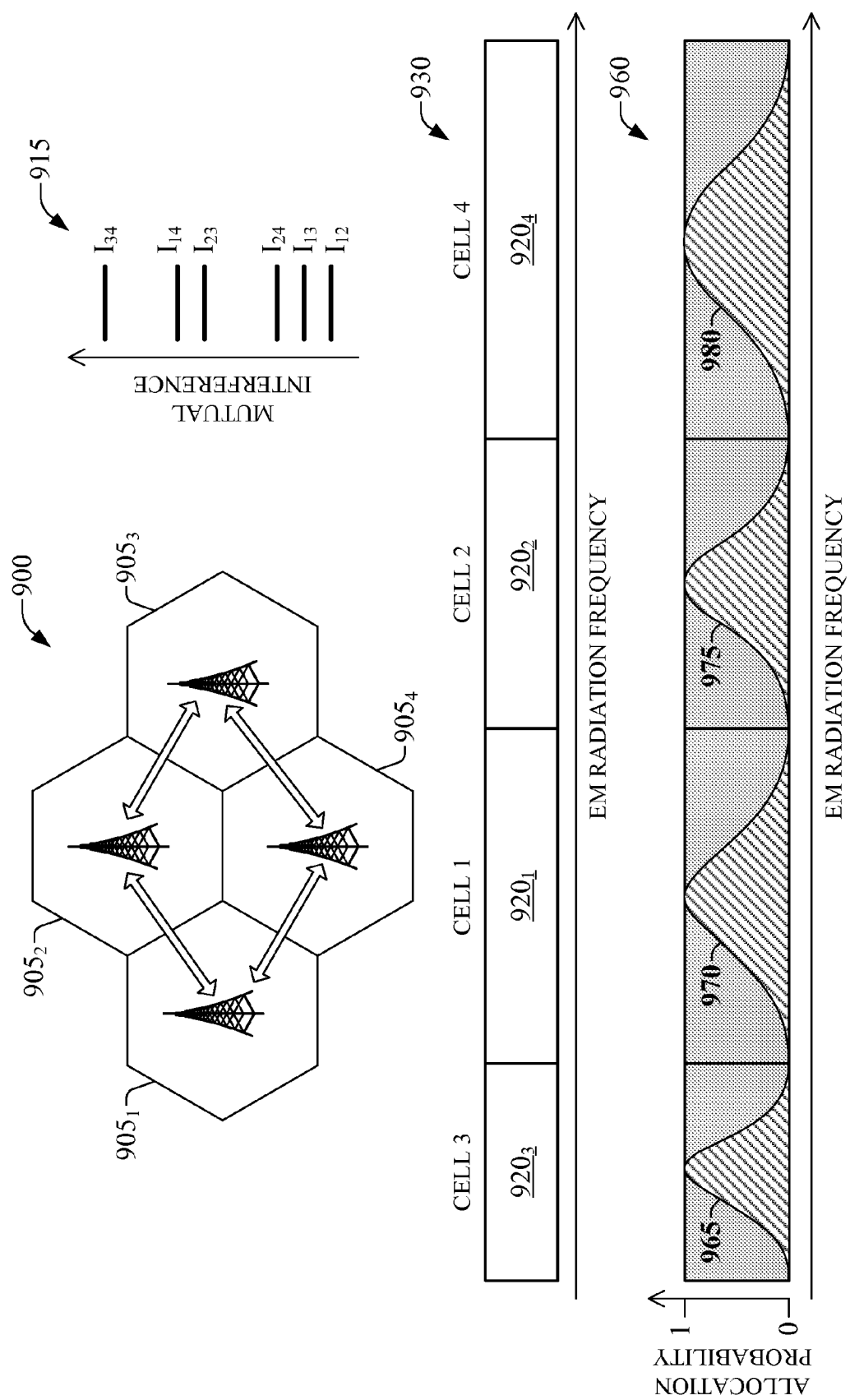
FIG. 9 presents an example allocation of frequency resources in response to current or nearly-current inter-cell interference in a cluster of coverage cells in accordance with features of the subject disclosure.

Repacking of frequency resources thus can improve resource allocation for various interference condition(s). In particular, scheduler platform 310, or component(s) therein, also can grant radio resources in response to, or to accommodate, inter-cell interference, as illustrated in FIG. 9. The displayed example allocation of frequency resources can optimize or nearly-optimize inter-cell interference condition(s) in a cluster of four coverage cells $905_1$-$905_4$. The inter-cell interference condition(s) can be current or historical; in view of the periodic scheduling of radio resources (see, e.g., FIG. 2), in one or more scenarios, such inter-cell interference can correspond to historical values of mutual interference. In addition, scheduler platform 310, or component(s) therein, can assess mutual inter-cell-interference through construction of a mutual interference matrix $I_{\alpha\beta}$ (with $\alpha,\beta$ a positive integer) via collection of load condition(s) 202, as described supra. For the cluster of cells illustrated in diagram 900, at a specific time, mutual interference can be represented by the set of values $\{I_{12}, I_{13}, I_{14}, I_{23}, I_{24}, I_{34}\}$. For relative magnitudes of such values of inter-cell interference as illustrated in diagram 915, scheduler platform 310, or component(s) therein, can generate color allocation 930 and produce allocation probability profiles 965, 970, 975, and 980, as presented in diagram 960. Frequency blocks $920_1$-$920_4$ can increase spectral separation amongst cells with larger inter-cell interference. Likewise, frequency resources granted to high-priority traffic (represented with dashed surface) also display increased spectral separation for traffic in cells with higher mutual interference. As inter-cell interference condition(s) change, e.g., values in diagrams 915 are modified in view of operation condition in cluster shown in diagram 900, scheduler platform 310, or component(s) therein, can adjust allocation of frequency resources (e.g., diagrams 930 and 960) to accommodate changed mutual interference condition(s).

In addition or in the alternative, repacking of frequency resources can mitigate high-traffic collisions that can result from allocation of spectrally overlapping frequency-time resources to user equipment in disparate cells or sector. Traffic collision risk can be estimated, e.g., by stage II scheduler 314 via an analysis component (not shown), based in part on portion of overlapping frequency-time resources allocations, or assignments, between cell or sectors with highest or substantially highest mutual interference. In an aspect, mutual interference can be estimated by stage II scheduler 314, via the analysis component (not shown), through determination of traffic served in overlapping regions where reported neighbor interference is similar; stage II scheduler can receive reports of interference as part of load condition(s) 202 and via backhaul pipe(s) that functionally connect one or more base stations.

In an aspect of the subject disclosure, to provide reservation of resources (e.g., PRB(s)) to a mobile device, scheduler platform 310 can guarantee specific capacity for set(s) of one or more traffic flows, e.g., GBR flow(s) 224 or n-GBR flow(s) 226. In an aspect of the subject disclosure, capacity guarantee(s), or committed capacity lower bound, can be afforded via service curve(s), or service function(s), as described hereinafter. Such service curve(s), or service function(s), can be determined for a specific set of frequency-time resources (e.g., PRBs) and for specific user equipment. In contrast to conventional scheduling approaches in which a bit rate guarantee for a traffic flow is provided based upon a continuum model, e.g., based on an idealized Generalized Processor Sharing (GPS) node as part of conventional Weighted Fair Queuing (WFQ), service curve(s) can establish a capacity guarantee that incorporates the discrete, e.g., packetized, nature of a traffic flow.

Definition of a service curve, also referred to as service function, generalizes the continuum GPS scheduling model in the following manner. For an input flow R, e.g., GBR flow(s) 224, which is served with an allocated bit rate ρ and has an associated output flow R* and in the absence of overflow (e.g., scheduler buffer sufficiently large to avoid traffic rejection), output flow at time t for a busy period that starts at time $t_0$, can satisfy $$R^*(t)-R^*(t_0) \geq \rho \times (t-t_0).$$

In addition, under the assumption of null backlog at time $t_0$, which can be expressed as $R(t_0)-R^*(t_0)=0$, net output flow at time t after busy period starting instant $t_0$ can obey $$R^*(t)-R(t_0) \geq \rho \times (t-t_0).$$

Accordingly, for a time t, the net output flow can be bound as follows:

$$R^*(t) \geq \inf_{0 \leq t_0 \leq t} \{R(t_0)+\rho \times (t-t_0)\},$$

where $\inf_{arg} \{S\}$ denotes the infinum of set S spanned over domain arg.

A service function β(t−s), with s a delay that demarcates packet traffic initiation, can be defined as $$R^*(t) \geq \inf_{s \leq t} \{R(s)+\beta(t-s)\} \quad \text{(Eq. (1))}$$

if and only if β(τ), with τ a real argument, is wide sense increasing, β(0)=0, and output flow at t is lower bounded through the min-max convolution of input flow and β(τ) and an initial incoming flow $R(\tau_0)$, with $\tau_0$ the initial time; namely, $$R^*(\tau) \geq R(\tau_0) \otimes \beta(\tau-\tau_0).$$

Figure 10:
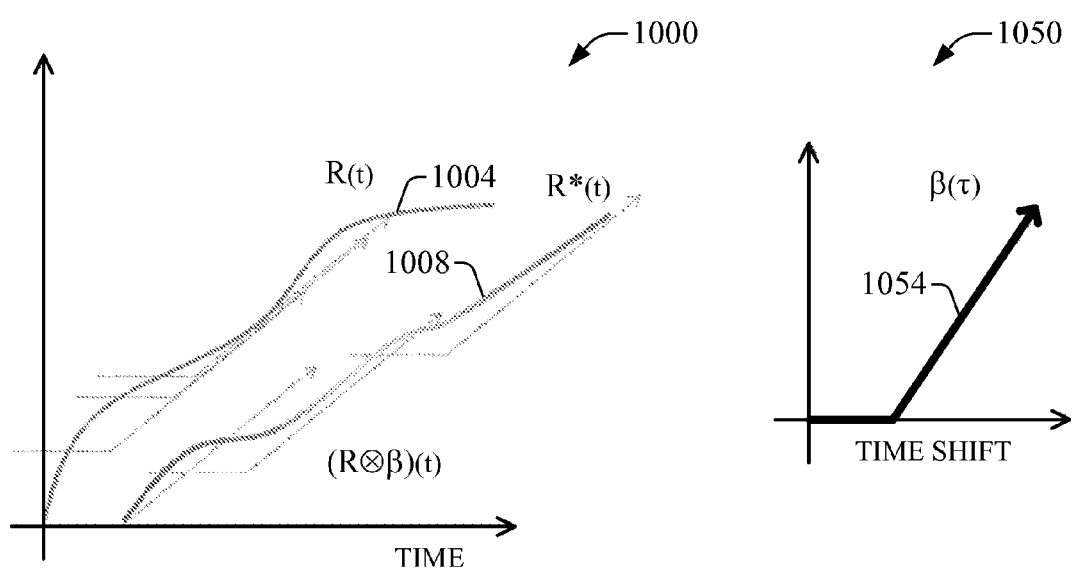
FIG. 10 illustrates input flow R(t) and estimated output flow R*(t) for a specific (UE,PRB) pair and an extracted service curve, or service function, in accordance with aspects disclosed herein.

For a continuous β(τ), R*(τ) can be bounded from below as follows:

$$R^*(\tau) \geq R_I(\tau_0)+\beta(\tau-\tau_0),$$

where $R_I(\tau_0)=sup_{\{s<\tau_0\}}R(s)$ and $sup_{\{set\}}F(\cdot)$ is the supremum of function F(·) over domain set {set}. Scheduler platform 310, via, for example, stage II scheduler 314, can compute β(t−s) from Eq. (1) for a specific (mobile device, frequency-time set) pair through computation of output flow for the specific frequency-time set, e.g., PRB, and mobile device and based on requested input flow, e.g., GBR flow(s) 224. FIG. 10 illustrates, in chart 1000, input flow R(t), represented with solid line 1004, and estimated output flow R*(t), represented with solid line 1008, for a specific (UE,PRB) pair and an extracted service function, while in chart 1050 an extracted service function β(τ) is displayed; thick line 1054 with arrow-head) as a function of time shift. For illustration purposes, lower envelope $R(\tau_0) \otimes \beta(\tau-\tau_0)$ can be generated within an simplified model in which the service function in diagram 1050 can be rigidly shifted in accordance with incoming flow $R(\tau_0)$.

Since channel quality indicator (CQI) for a specific (UE, {frequency-time resource(s)}) pair can be time dependent in view of the dynamic nature of the air-interface, capacity associated with {frequency-time resource(s)} (e.g., one or more PRBs) is not constant—as indicated supra, in a scenario, capacity can be established in Kbps. Accordingly, scheduler platform 310, which can reside in an eNode B, can provide variable service capacity to the specific UE in the (UE, {frequency-time resource(s)}) pair. To account for the dynamic nature of the provided capacity, e.g., afforded Kbps, of the (UE, {frequency-time resource(s)}) pair, scheduler platform 310 can generate a cumulative function M(t), where M(t) can be the total service capacity, for example, estimated in bits, that is available to a traffic flow such as GBR traffic 224, between instants 0 and t. In an aspect, stage II scheduler 314 can generate, at least in part, the cumulative function M(t), which can be retained in data storage 338; method(s) to generate M(t) can be stored in algorithm storage 334. Stage II scheduler 314 can generate, e.g., compute, the cumulative function M(t) under the assumption that a node buffer, e.g., at least a portion of data storage 338, is sufficiently large to accommodate incoming traffic flow(s), e.g., traffic input 222, and avoid overflow. In one or more embodiments, if scheduler platform 310 is implemented as part of a telecommunication network that exploits LTE radio technology and thus exploits Orthogonal Frequency Division Multiplexing, M(t) can be the aggregated number of bits conveyed within the (0,t] interval in a set of frequency-time resources that comprise a specific PRB. As an example, it should be noted that for GBR services such as VoIP, the specific PRB allocation can be repeated with a period, or cadence, of 20 ms.

In an aspect, if the time-dependent capacity of a set of frequency-time resources, e.g., a PRB, satisfies a minimum guarantee of the form $$M(t)-M(s) \geq \gamma(t-s),$$

for some fixed function γ and for all 0≤s≤t, then γ(t−s) can be a strict service curve, or service function, as defined supra. Scheduler platform 310, or one or more components therein, can compute a service curve γ(t−s) and related slope γ'(t−s)=dγ(t−s)/dt. Scheduler platform 310, or the one or more components therein, can cast γ'(t−s) as a guaranteed bit rate provided by a specific set of frequency-time resources, e.g., a specific PRB, for which service curve γ(t−s) can be computed. It should be appreciated that for GBR services such as VoIP communication, e.g., transmission, that are scheduled periodically with a predetermined cadence, e.g., 20 ms, the guaranteed bit rate as determined by γ'(t−s) can be recomputed and adjusted, e.g., scaled, accordingly. In an aspect, stage II scheduler 314 can compute service curve γ(t−s) and its slope γ'(t−s)=dγ(t−s)/dt.

Figure 11A:
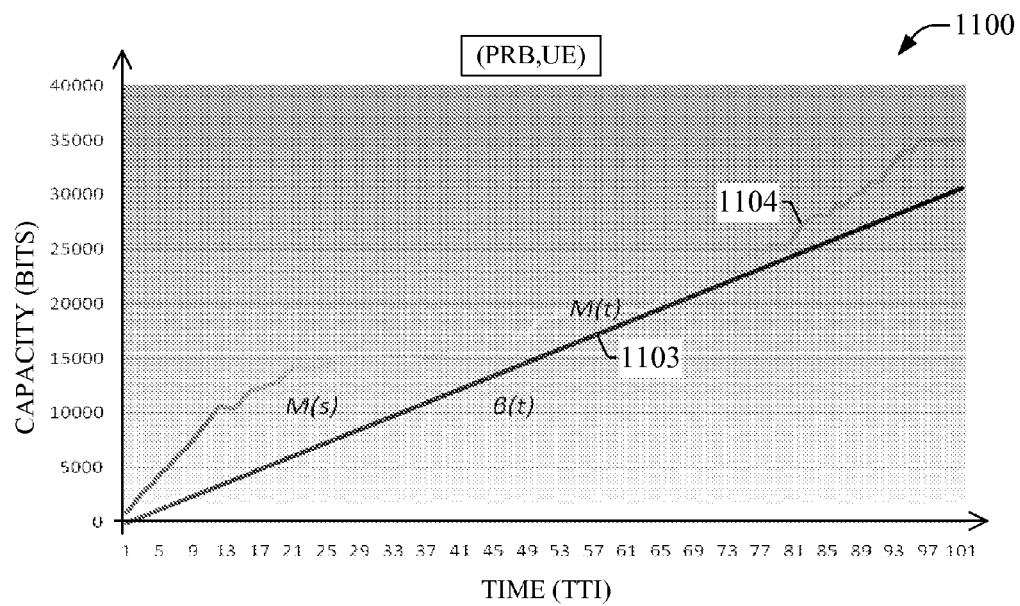
FIGS. 11A-11B illustrate computed service curves, or service functions, that establish guaranteed bit rates in accordance with aspects of the subject disclosure.
Figure 11B:
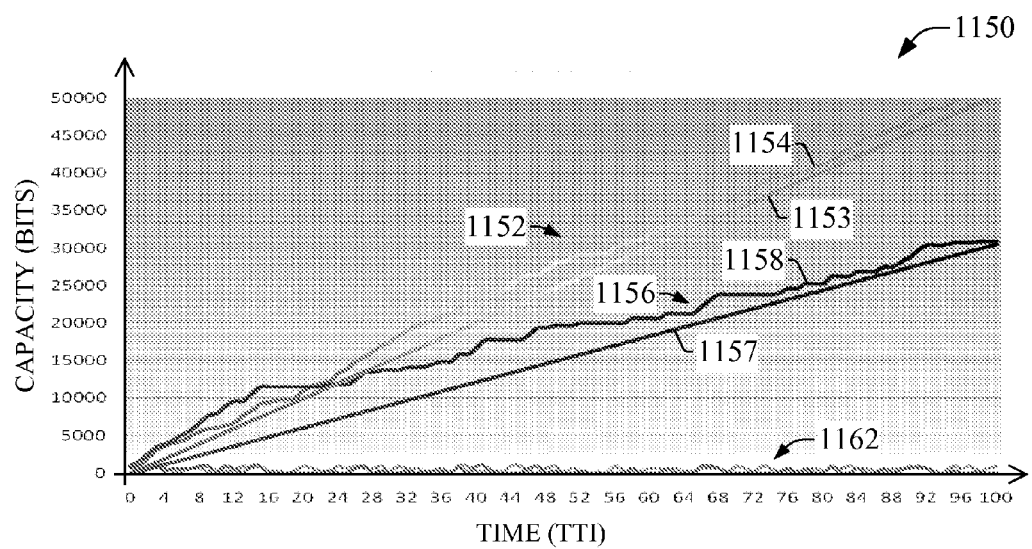

FIGS. 11A-11B illustrate example cumulative functions M(t) for specific pairs (PRB,UE), and related service curves γ(t−s) extracted from the cumulative functions under the assumption of null delay, e.g., s=0. Time t can be in units of transmission time interval (TTI) and capacity can be in bits per interval (0,t]. In chart 1100, straight line 1103 can be extracted service curve, whereas the remaining trace 1104, or line, can be the related cumulative function. It is noted that specific PRB in chart 1100 can be different from a set of two PRBs associated with respective cumulative functions and service curves that are displayed in diagram 1150. In diagram 1150, a first pair 1152 of traces illustrate the following: straight line 1153 can be extracted service curve and remaining trace 1154 can be cumulative function for a pair (PRB$_1$, UE$_1$). A second pair 1156 of traces illustrate the following: straight line 1157 can be an extracted service curve and remaining trace 1158 can be cumulative function for a pair (PRB$_2$,UE$_2$). Likewise, UE in chart 1100 can be different from pair of UEs associated with respective PRBs in diagram 1150. Diagram 1150 also displays traces 1162, which correspond to instantaneous capacity at instant t.

As described supra, service curve(s) can establish a lower bound for afforded bit rate or capacity of a set of frequency-time resources, e.g., one or more PRBs. Accordingly, scheduler platform 310, via, for example, stage II scheduler 314, can allocate resources, such as PRB(s), that match specific traffic specification(s) within the framework of Integrated Services (IntServ) as characterized by a manifold of one or more arrival curves:

$$\alpha(t)=\min(\mu+p \times t, r \times t+b),$$

where t is time, $\mu$ is maximum packet size conveyed in the traffic, p is peak rate, b is burst tolerance, and r is sustainable rate; and min(·,·) is the minimum function. Within IntServ, four-tuple ($\mu$,p,r,b) represents a particular traffic specification (T-SPEC). T-SPEC parameters for GBR and n-GBR services can be specified and retained in a network memory, or repository, such as a call control database, which can be part of a Home Location Register (HLR), a Home Subscriber Server (HSS), or the like. In addition or in the alternative, T-SPEC parameters can be retained in a memory functionally coupled to scheduler platform 310, or any other scheduler described herein.

For example, memory 320 can retain T-SPEC parameters for GBR and n-GBR services within data storage 338. Based at least in part on T-SPEC for a specific UE, scheduler platform 310, or any other scheduler platform described herein, can match, as part of call admission phase, per-UE T-SPEC bit requirements with available frequency-time resources, e.g., a set of PRBs. In one or more embodiments, stage II scheduler 314 can compute an arrival curve ($\alpha$(t)) for a specific service, either GBR service or n-GBR service and related data flows, in accordance with available (e.g., retained in an accessible memory, such as memory 320) T-SPEC parameters. In addition, in such one or more embodiments, stage II scheduler 314 can match bit-rate requirement(s), as determined by a computed arrival curve according to per-UE T-SPEC, with available frequency-time resources. It should be appreciated that matching of bit requirement(s) and available frequency-time resources can enable a satisfactory (e.g., optimal or nearly-optimal) allocation of such available frequency-time resources, e.g., a set of PRBs.

In a further aspect of the subject disclosure, slope $\beta'(t-s)=d\beta(t-s)/dt$ of a service curve $\beta(t-s)$ can characterize long-term performance of a specific set of frequency-time resources, e.g., a PRB, for which $\beta(t-s)$. Thus, scheduler platform 310 or any other scheduler platform described herein can offload scheduling of call session(s) (e.g., VoIP session(s), FTP session(s) . . . ) from multi-stage scheduling as described herein to Semi-Persistent Scheduling (SPS) to increase call handling capacity for a cell or a sector. Scheduler platform 310, via, for example a monitoring component (not shown), can monitor performance of the cell or sector and, if at an instant the frame error rate (FER), for example, increases beyond a predetermined threshold, the call session(s) can be dispatched back from SPS to multi-stage scheduling, or chromatic scheduling, implemented by scheduler platform 310 or component(s) therein.

In another aspect of the subject disclosure, scheduler platform 310 or any other scheduler platform described herein can improve utilization of radio link quality information, e.g., CQI reports, or channel state information (CSI), such as channel rank, available in radio link condition(s) 221, to grant radio resources for traffic telecommunication. To at least such end, stage II scheduler 314 can extract radio link condition(s), e.g., CQI reports or CSI, for a first set of radio resources from received radio link condition(s) 221; the extracted radio link condition(s) can be generated by a first set of wireless devices. The first set of radio resources need not be granted to one or more wireless devices in the first set of wireless devices; e.g., a mobile handset can generate radio link condition(s) for radio resources (e.g., PRBs) at a time in which such radio resources have not been granted to the mobile handset. The first set of radio resources can include frequency resources, e.g., physical resource blocks for different sub-carrier bandwidth, which span various portions of a color allocation.

For instance, the first set of radio resources can include frequency resources (e.g., PRB(s)) for disparate coverage cells or sector, such as frequency resources in blocks 420$_1$ and 420$_2$. The first set of wireless devices can include wireless devices that operate in one or more coverage cells or sectors, and consume (e.g., transmit and receive) low-priority traffic, such as n-GBR flow(s) 226. In one or more scenarios, the first set of radio resources can include PRBs that are allocated for telecommunication of high-priority traffic through a mobile device located in the vicinity of the edge of a coverage cell or sector (e.g., UE 415$_3$). Additionally, stage II scheduler 314 can extract radio link condition(s) for a second set of resources, wherein CQI reports or CSI can be generated by a second set of wireless devices. Similar to the first set of wireless devices, the second set of wireless devices can include wireless devices that operate in one or more coverage cells. However, differently from the first set of wireless devices, wireless device(s) in the second set of wireless devices can consume high-priority traffic (e.g., GBR flow(s) 224). The second set of radio resources can span various portions of a color allocation and can overlap, at least in part, with the first set of radio resources. Extracted radio link condition(s) can be retained in data storage 338.

Through the extracted radio link condition(s), in an aspect, stage II scheduler 314 can assess a path loss metric for one or more wireless devices in the first set of wireless devices and in the second set of wireless devices. The path loss metric can be determined in accordance with one or more models of electromagnetic propagation in the environment in which the first and second sets of wireless devices operate. Based on value(s) of the assessed path loss metric, stage II scheduler 314 can generate one or more groups or segments of wireless devices with value(s) of path loss metrics within a predetermined interval, and thus identify a wireless device with a path loss metric value within a specific range. In particular, though not exclusively, stage II scheduler 314 can identify a first wireless device (e.g., UE 415$_1$) that can be part of the first set of wireless devices, wherein the first wireless device has a first path loss value within a tolerance from a second path loss value for a second wireless device (e.g., UE 415$_2$) in the second set of wireless devices. The second wireless device can operate in the same cell (e.g., cell 405$_1$) in which the first wireless device operates.

Through identification of the first and second wireless device with relative path loss metrics within a predetermined tolerance, scheduler platform 310, via one or more components therein or in part through processor(s) 340, can schedule a group of radio resources in the second set of radio resources for the second wireless device based at least in part on the collected radio link condition(s) for the first set of radio resources. It should be appreciated that the scheduled group of radio resources can be directed to granting radio resources for telecommunication of high-priority traffic. Accordingly, the second wireless device that consumes high-priority traffic can be assigned optimized or nearly-optimized radio resources (e.g., set of PRBs) in accordance with the multi-stage scheduling described herein, without incurring costly uplink signaling.

In one aspect of utilization of radio link quality information, e.g., one or more CQI reports or channel state information (CSI), such as channel rank, dependency on some of the inter-eNB load information exchange can be reduced and optimization or near optimization of allocation of frequency-time resources can be nearly real-time. In addition, in view of the granularity and availability of radio link information generated and signaled by user equipment that consumes low-priority traffic, utilization of such radio link information can improve exploitation of time-dependent traffic patterns for producing maximum or nearly-maximum capacity of a set of base stations.

It is noted that EM radiation propagation aspects such as fading or Doppler effect can compromise, at least partially, the validity of the assumption of similar interference environments for the first wireless device and the second wireless device. To utilize radio link quality information generated by wireless devices that consume low-priority traffic and avoid conditions that invalidate the assumption of similar interference environment(s), scheduler platform 310, via one or more components therein or in part through processor(s) 340, can exploit radio link quality information generated by stationary or pseudo-stationary devices that communicate wirelessly and assign radio resources based at least in part on such radio link quality to mobile devices.

In example system 300, stage I scheduler 312, stage II scheduler 314, and stage III scheduler 316 can exploit clock layer 318 to account for elapsed time. Clock layer 318 can implement clock strata and time-stamp features in accordance with Network Time Protocol to supply timing information necessary for periodic reiteration of multi-stage scheduling.

In example system 300, processor(s) 340 can be configured to provide or can provide, at least in part, the described functionality of the various components or layer(s) of scheduler platform 310. To provide such functionality, processor(s) 340 can be functionally coupled (indicated with arrows in FIG. 3) through a bus (not shown) or any other information exchange conduit, protocol, or mechanism among disclosed memory(ies) or component(s) or subcomponents. Such bus or conduit can be embodied in at least one of a memory bus, a system bus, an address bus, or a message bus, for data. In an aspect, processor(s) 340 can execute code instructions (not shown) stored in memory 320 or alternative or additional memory components or elements therein, to provide the described functionality of example system 300 and various components thereof.

In addition to memory elements described supra, and illustrated in FIG. 3, for example, memory 320 can retain template(s) of service curves, cumulative service curves, or arrival curves, based on determined, e.g., computed, historical values. Such template(s) can be generated, for example, as described herein. Memory 320 also can retain template(s) of preferred color allocations, as described supra.

In additional or alternative embodiment(s), scheduler platform 310 and component(s) or layer(s) therein can be retained in memory 310 as one or more sets of code instructions, which can be executed by processor(s) 340 to implement scheduler platform 310 and described functionality thereof.

Scheduler platform 1220 and components therein, memory 320, and processor(s) 340 can be part of or embodied in a base station. In addition or in the alternative, in an EPS network, scheduler platform 310 or one or more scheduler components therein, such as stage I scheduler 312, stage II scheduler 314, or stage III scheduler 316, can be embodied, at least in part, in a Medium Access Control/Radio Link Control (MAC/RLC) packet scheduler server or node. As discussed hereinafter, other components (e.g., stage I scheduler client component 1222, also referred to herein and in the annexed drawings as stage I scheduler client 1222) that enable scheduling aspects described herein also can be embodied in part in the MAC/RLC packet scheduler server or node. Moreover, or as another alternative, one or more components of scheduler platform 1220 or functional elements functionally coupled thereto, e.g., processor(s) 340, memory 320, can be part of or embodied in user equipment, wherein processor(s) and memory of the UE can be exploited to implement the one or more components of scheduler platform 1220 and associated functionality.

Figure 12:
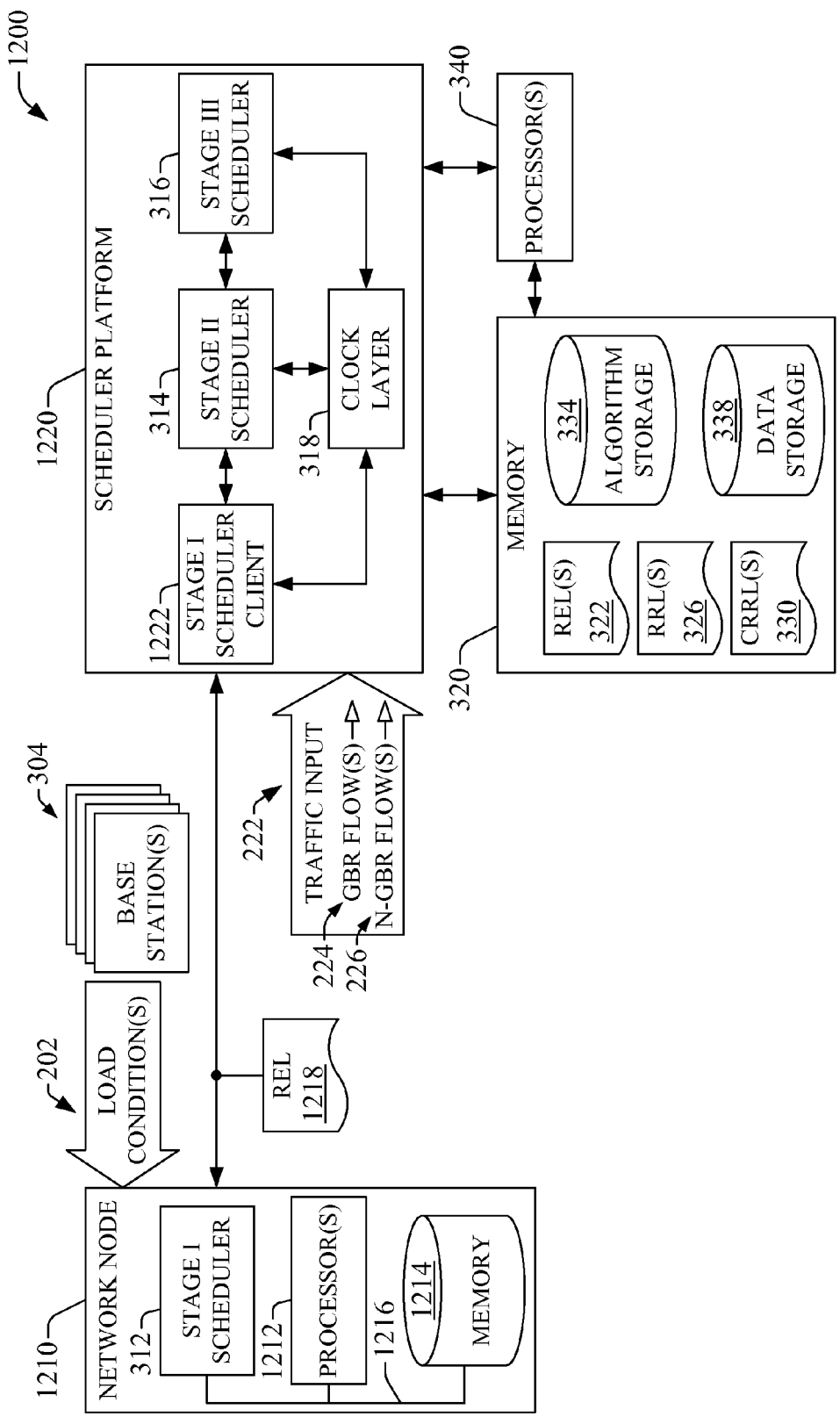
FIGS. 12-13 are block diagrams of example systems that enable multi-stage scheduling logic in accordance with aspects described herein.

FIG. 12 is a block diagram of an example system 1200 that enables multi-stage scheduling logic in accordance with aspects described herein. For a substantive number (e.g., $10^3$-$10^5$) of base stations in the set of base stations 304, performance of distributed scheduling 210 in network node 1210 can reduce processing load at a base station in which a scheduler platform 1220 can reside. Network node 1210 can be embodied in one of a network server (e.g., an application server), a network controller, a network gateway, or the like. In the subject example system, stage I scheduler 312 can perform distributed scheduling 210 within network node 1210. Stage I scheduler can operate in the same manner as described supra; methodologies exploited to generate a color allocation and supply a related REL 1218 can reside within memory 1214; REL 1218 can convey the color allocation produced by stage I scheduler 312.

To enable implementation of distributed scheduling 210, network node 1210 can collect load condition(s) 202 from the set of base station(s) 304. In an aspect, to consume color allocation(s), e.g., REL(s) 1218, in multi-stage scheduling, scheduler platform 1220 can include a stage I scheduler client component 1220, also termed herein and in annexed drawings stage I scheduler client 1220, which can receive the color allocation(s). Stage I scheduler client 1220 can deliver an indication to stage I scheduler 312 to supply, e.g., generate and deliver, a color allocation based on load condition(s) 202 collected at the network node 1210. Such indication can be conveyed periodically with period $\Delta\tau_I$.

In example system 1200, processor(s) 340 also can be configured to provide or can provide, at least in part, the described functionality of the various components or layer(s) of scheduler platform 1220. To provide such functionality, processor(s) 340 can be functionally coupled (indicated with arrows in FIG. 12) through a bus (not shown) or any other information exchange conduit, protocol, or mechanism among disclosed memory(ies) or component(s) or subcomponents. Such bus or conduit can be embodied in at least one of a memory bus, a system bus, an address bus, or a message bus, for data exchange. In an aspect, processor(s) 340 can execute code instructions (not shown) stored in memory 320 or alternative or additional memory components or elements therein, to implement the described functional elements of system 1200 or provide the described functionality of example system 1200 and various components thereof.

In additional or alternative embodiment(s), scheduler platform 1220 and component(s) or layer(s) therein can be retained in memory 320 as one or more sets of code instructions, which can be executed by processor(s) 340 to implement scheduler platform 1220 and described functionality thereof.

Similarly, processor(s) 1212 can be configured to provide or can provide, at least in part, the described functionality of the various components of network node 1210. To provide such functionality, processor(s) 1212 can be functionally coupled through a bus 1216 or any other information exchange conduit, protocol, or mechanism among disclosed memory(ies) or component(s) or subcomponents. Such bus or conduit can be embodied in at least one of a memory bus, a system bus, an address bus, or a message bus, for data. In an aspect, processor(s) 1212 can execute code instructions (not shown) stored in memory 1214 or alternative or additional memory components or elements therein, to provide the described functionality of network node 1210 and various components thereof. In another aspect, memory 1214 can retain default template(s), or predefined configuration(s), for initial color allocation(s), which can be determined, for example, by stage I scheduler via at least in part processor(s) 1212.

In additional or alternative embodiment(s), stage I scheduler 312 can be retained in memory 1214 as one or more sets of code instructions, which can be executed by processor(s) 1212 to implement stage I scheduler 312 and described functionality thereof.

Figure 13:
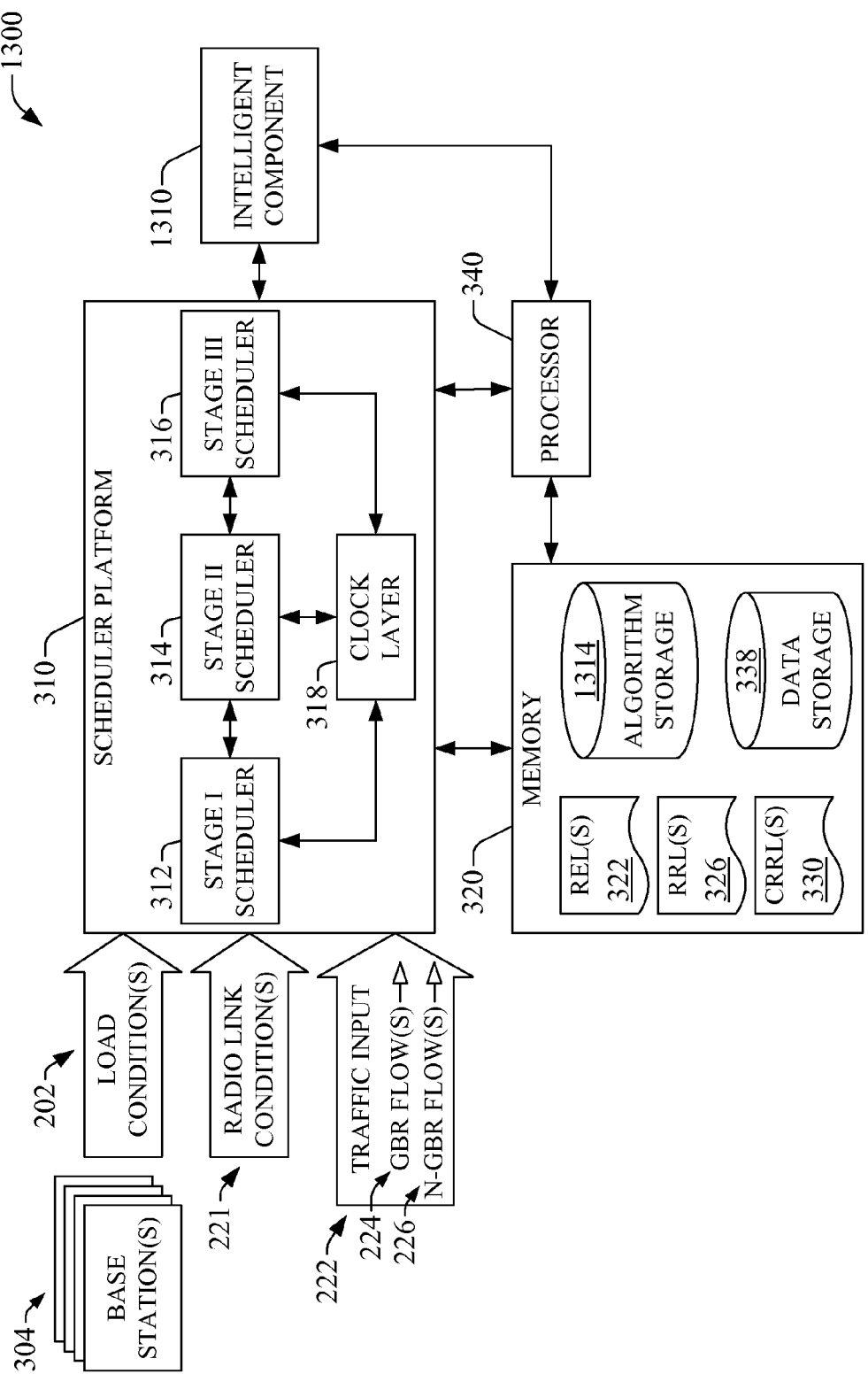

FIG. 13 is a block diagram of an example system 1300 that enables multi-stage scheduling logic in accordance with aspects described herein. The subject example system includes an intelligent component 1310 functionally coupled to scheduler platform 310. Intelligent component 1310 can automate various aspects of multi-stage scheduling described in the subject disclosure. As described supra, intelligent component 1310 can autonomously generate scheduling periods $\Delta\tau_I$, $\Delta\tau_{II}$, and $\Delta\tau_{III}$. Such autonomous determination can be based on cost-utility analysis of various realizations of the three-tuple ($\Delta\tau_I$, $\Delta\tau_{II}$, $\Delta\tau_{III}$). In addition, intelligent component 1310 can predict suitable color allocation(s) based on historical data on load condition(s) associated with a set of base station(s), e.g., 304, and patterns present in the historical data; intelligent component 1310 can extract such patterns. In an example scenario, intelligent component 1310 can extract at least one of a spatial pattern or temporal patter of traffic in the set of base stations and predict a set of load condition(s) without incurring signaling associated with collection of load condition(s) 202.

In another example scenario, based on temporal or spatial pattern of load condition(s), intelligent component 1310 can generate time-dependent or location-based (e.g., for a subset of base stations in set of base stations 304) scheduling periods $\Delta\tau_I$, $\Delta\tau_{II}$, and $\Delta\tau_{III}$. Intelligent component 1310 can retain predicted values of scheduling periods or extracted patterns of load condition(s) in data storage 338. In yet another example scenario, intelligent component 1310 can collect statistics or data on historical values of service curves or cumulative service curves generated as part of multi-stage scheduling, and generate one or more templates. Intelligent component 1310 can retain such templates in memory 320, within data storage 338, for example, and scheduler platform 310, or one or more components therein (e.g., stage II scheduler 314) can exploit such templates to speed-up computations of current or nearly-current service curves or cumulative service curves as part of a current scheduling stage or cycle. In one or more embodiments, templates generated from historical values of service curves or cumulative service curves can be retained in a centralized network element (e.g., network node 1210; not shown in FIG. 13) and supplied to one or more base stations to produce, at least in part, current or nearly-current service curves or cumulative service curves.

In an aspect, intelligent component 1310 can perform artificial intelligence (AI) methods to infer (e.g., reason and draw a conclusion based upon a set of metrics, arguments, or known outcomes in controlled scenarios) suitable color allocation(s) or scheduling periods; to extract pattern of load condition(s); or to perform cost-utility analysis. In an aspect, AI methods can be retained in algorithm storage 1314, which also can comprise contents of algorithm storage 334. Artificial intelligence techniques can apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

In example system 1300, processor(s) 340 also can be configured to provide or can provide, at least in part, the described functionality of the various components or layer(s) of scheduler platform 310 or intelligent component 1310. To provide such functionality, processor(s) 340 can be functionally coupled (indicated with arrows in FIG. 12) through a bus (not shown) or any other information exchange conduit, protocol, or mechanism among disclosed memory(ies) or component(s) or subcomponents. Such bus or conduit can be embodied in at least one of a memory bus, a system bus, an address bus, or a message bus, for data. In an aspect, processor(s) 340 can execute code instructions (not shown) stored in memory 320 or alternative or additional memory components or elements therein, to provide the described functionality of example system 1300 and various components thereof.

In additional or alternative embodiment(s), scheduler platform 310, component(s) or layer(s) therein, and intelligent component 1310 can be retained in memory 320 as one or more sets of code instructions, which can be executed by processor(s) 340 to implement scheduler platform 310 and described functionality thereof.

In view of the example system(s) described above, example method(s) that can be implemented in accordance with the disclosed subject matter can be better appreciated with reference to flowcharts in FIGS. 14-19. For purposes of simplicity of explanation, methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more methods disclosed herein could alternatively be represented as a series of interrelated states or events, such as in a state diagram. Moreover, interaction diagram(s) or call flow(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages described herein.

Methods disclosed throughout the subject specification and annexed drawings are capable of being stored on an article of manufacture to facilitate transporting and transferring such methods to computers for execution, and thus implementation, by a processor or for storage in a memory. In an aspect, one or more processors, such as processor(s) that enact the method(s) described herein, can be employed to execute code instructions retained in a memory, or any computer- or machine-readable medium, to implement method(s) described herein; the code instructions provide a computer- or machine-executable framework to enact the method(s) described herein.

Figure 14:
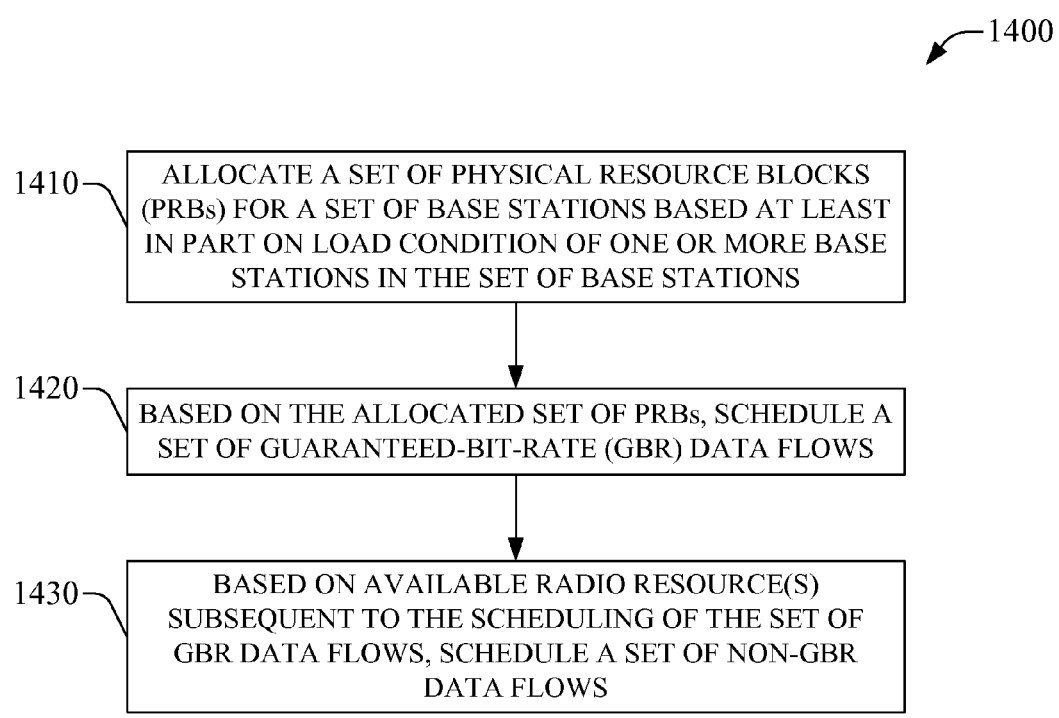
FIG. 14 presents a flowchart of an example method for allocating network resources for traffic with disparate service requirements according to aspects of the subject disclosure.

FIG. 14 is a flowchart of an example method 1400 for allocating network resources for traffic with disparate service requirements according to aspects of the subject disclosure. In an aspect, network component(s) (e.g., a Node B or one or more component(s) therein, a network management component such as network node 1210 or one or more component(s) therein . . . ) therein can implement, at least in part, the subject example method. In another aspect, one or more processors configured to provide or that provide at least part of the functionality to network component(s) (e.g., Node B, network gateway, a network server, a mobility management node . . . ) also can enact, at least in part, the subject example method. In yet another aspect, one or more processors that execute the network component(s) (e.g., Node B, network gateway, a network server, a mobility management node . . . ) or a set of code instructions that implement the network component(s) and associated functionality also can enact the subject example method. At act 1410, a set of physical resource blocks for a set of base stations can be allocated based at least in part on load condition of one or more base stations in the set of base stations. This act can be reiterated periodically with a period $\Delta\tau_I$ (e.g., 1 s, 60 s).

As described supra, magnitude of such period can be configured statically or dynamically. Resource allocation resulting from act 1410 can be a first scheduling phase that yields a specific color allocation or resource packing, as described supra, for the set of base stations. In contrast to conventional frequency reuse planning, color allocation can be dictated at least in part by load condition(s) of the set of base stations and allows for re-packing of PRBs in response to changes in such load condition(s) as revealed through periodic instantiation of act 1410.

At act 1420, based on the set of allocated set of PRBs (e.g., color allocation), a set of guaranteed-bit-rate (GBR) flows can be scheduled. In an aspect, scheduling of the set of GBR data flows can be based on priority scheduling (e.g., priority queuing (PQ)). Scheduling performed in act 1420 can be a second scheduling phase that can be specific to each base station in the set of base stations, since the set of GBR flows are specific to operation of subscriber station(s) in sector(s) served by a base station. This second scheduling phase can be conducted periodically with period $\Delta\tau_{II}$ (e.g., 20 milliseconds), which magnitude can be configured in the same or nearly the same manner as configuration of $\Delta\tau_I$. In another aspect, $\Delta\tau_{II} < \Delta\tau_I$.

At act 1430, based on available radio resources(s) subsequent to the scheduling of the set of GBR data flows, a set of non-GBR data flows can be scheduled. In an aspect, scheduling of the set of non-GBR data flows can be based on fair scheduling (e.g., Weighted Fair Queuing). Scheduling performed in act 1430 can be a third scheduling phase that can be specific to each base station in the set of base stations, since the set of non-GBR flows are specific to operation of subscriber station(s) in sector(s) served by a base station. This third scheduling phase can be conducted periodically with period $\Delta\tau_{III}$ (e.g., 1 millisecond), which magnitude can be configured in the same or nearly the same manner as configuration of $\Delta\tau_I$ or $\Delta\tau_{II}$. In another aspect, $\Delta\tau_{III} < \Delta\tau_{II}$.

Figure 15:
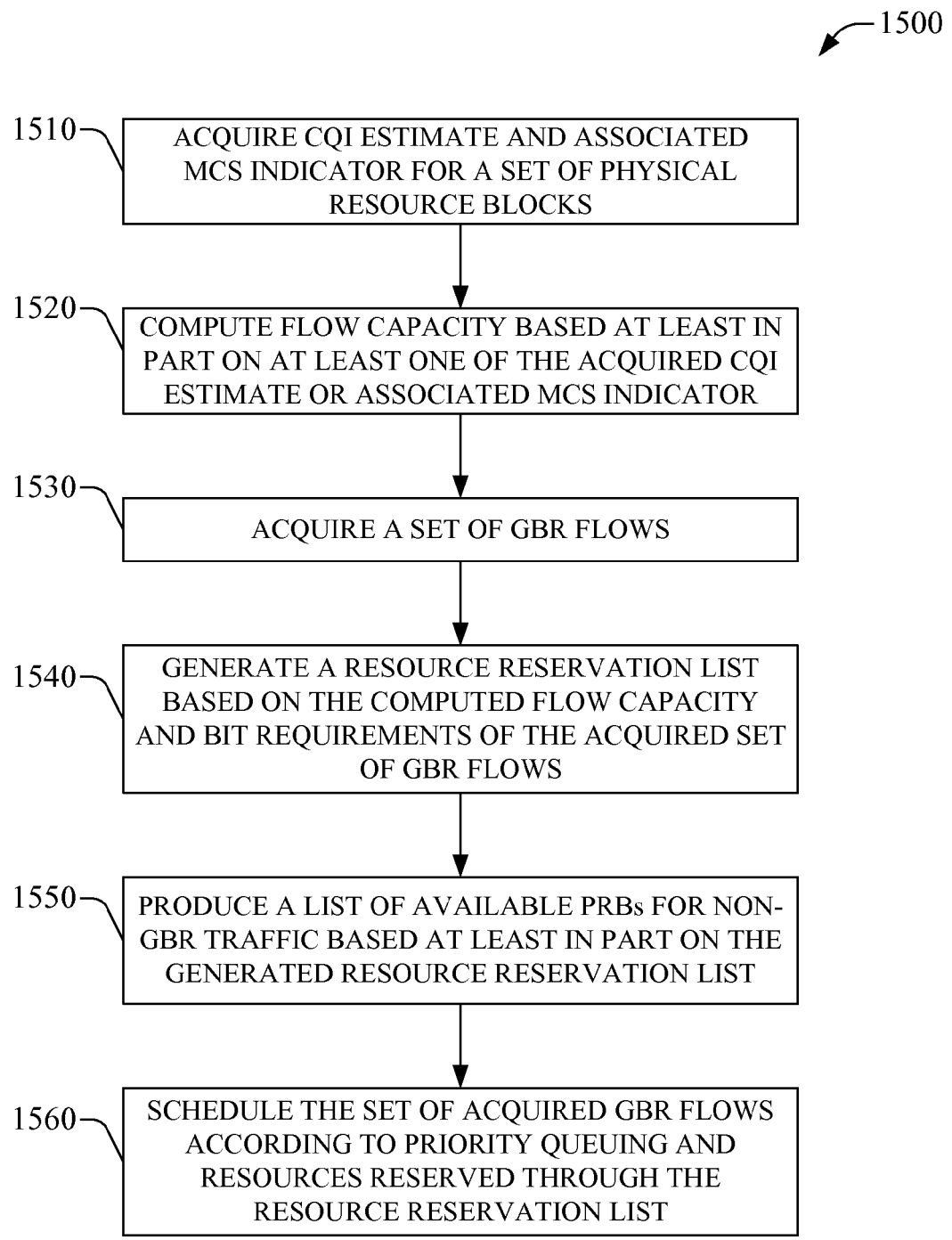
FIG. 15 is a flowchart of an example method for scheduling a set of guaranteed-bit-rate (GBR) flows according to aspects described herein.

FIG. 15 is a flowchart of an example method 1500 for scheduling a set of GBR flows according to aspects described herein. Network component(s) or processor(s) that enact example method 1400 can effect the subject example method, which is an example of or can be enacted as part of act 1420 described supra. The subject example method 1500 can be specific to a base station that serves one or more sectors. At act 1510, channel quality indicator (CQI) and associated modulation and coding scheme (MCS) indicator can be acquired for a set of PRBs. In an aspect, CQI and MCS can be acquired from a subscriber station (e.g., 3GPP LTE user equipment), which can exploit various reporting procedures to convey CQI and MCS indicator. In addition or in the alternative, acquiring CQI and associated MCS can include determining a radio link quality metric (e.g., signal-to-noise ratio) based at least on data (e.g., radio link condition(s) 221) collected by a scanner component in a base station that hosts the network component(s) or processor(s) that enact the subject example method.

At act 1520, flow capacity can be computed based at least in part on at least one of the acquired CQI estimate or MCS associated with the acquired CQI. Flow capacity can be computed for each PRB in a group of PRBs that can span the set PRBs for which the CQI and related MCS are acquired, or be a sub-set thereof. In an aspect, flow capacity for a PRB can be computed based on one or more service curves, or service functions, as defined supra. In an additional or alternative aspect, Kaufman-Roberts recursion, or algorithm, for two classes of incoming traffic: GBR traffic and non-GBR traffic can be employed to estimate or allocate GBR capacities to any GBR service request. At act 1530, a set of GBR flows can be acquired. Acquiring such GBR flows can include receiving an indication of the set of GBR flows or scanning a memory (e.g., 320) that queues GBR traffic (e.g., GBR packets for various applications or services).

At act 1540, a resource reservation list (RRL) can be generated based on at least one of the computed flow capacity and bit requirements of the set of acquired GBR flows. A REL includes a set of frequency-time resources (e.g., PRBs) that are committed to a specific type of traffic, e.g., GBR traffic. Generation of the REL can thus ensure that second scheduling phase (act 1420) can accommodate available GBR traffic in accordance with demanded service level. It should be appreciated that the generated REL can be valid for the scheduling period $\Delta\tau_{II}$. At act 1550, a list of available PRBs for non-GBR traffic can be produced based at least in part on the generated RRL and the full group of PRBs for which flow capacity can be computed. The list that can be produced is termed herein Complementary RRL (CRRL) since it identifies resources available to non-GBR traffic and that exclude resources listed in the RRL (which thus serves as a black list of resources for non-GBR traffic). A CRRL has a one-to-one relationship with a precursor RRL. It should be appreciated that available best effort (BE) can be allocated in accordance with the produced CRRL. At act 1560, the set of acquired GBR flows can be scheduled according to priority queuing and resources reserved through the RRL. Packets that compose the GBR flows can be scheduled within an interval that substantially spans the scheduling period $\Delta\tau_{II}$.

Figure 16:
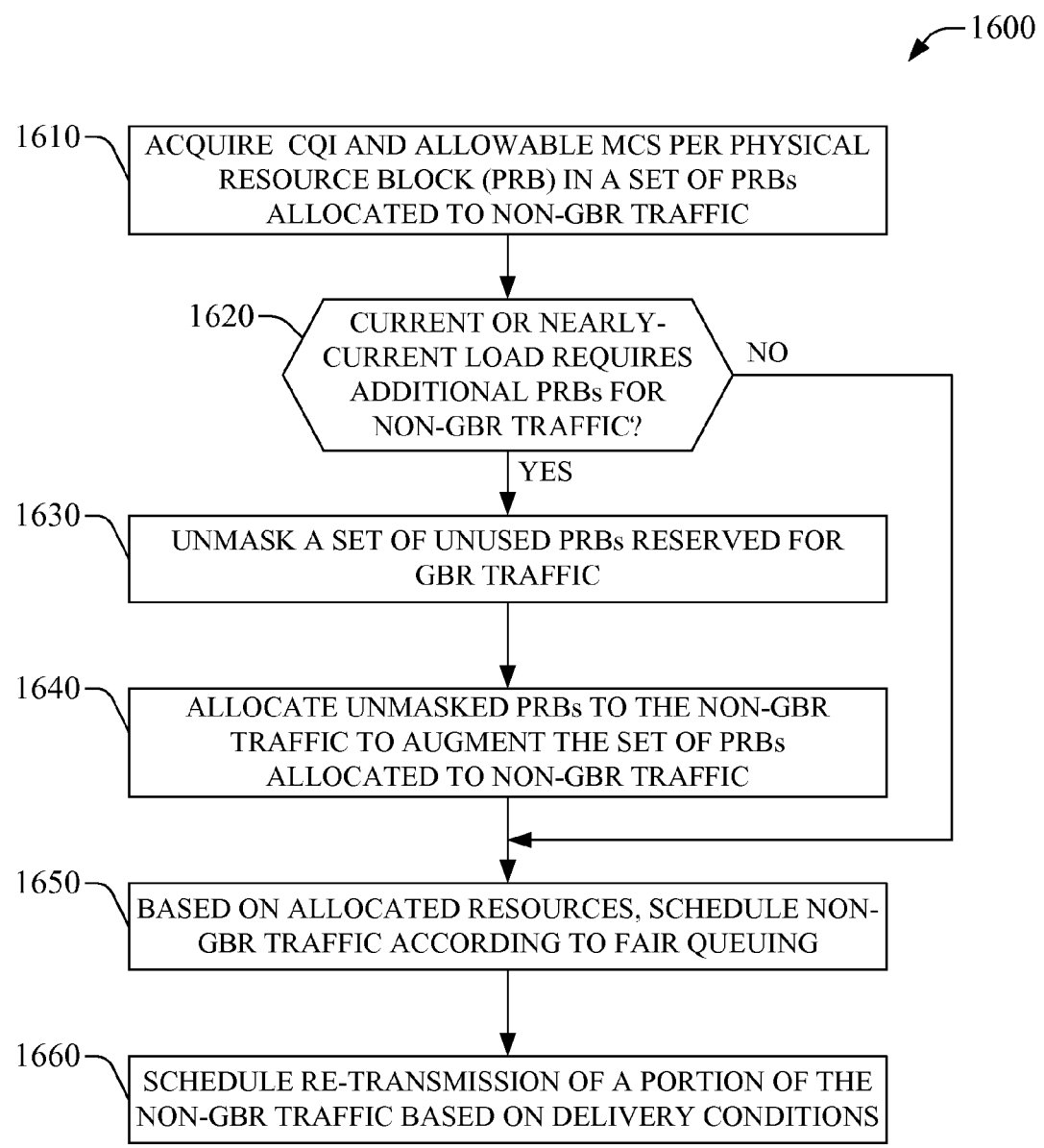
FIG. 16 is a flowchart of an example method for scheduling a set of non-GBR flows according to aspects described herein.

FIG. 16 is a flowchart of an example method 1600 for scheduling a set of non-GBR flows according to aspects described herein. Network component(s) or processor(s) that enact example method 1400 can effect the subject example method, which is an example of or can be enacted as part of act 1430 described supra. The subject example method 1600 can be specific to a base station that serves one or more sectors; particularly, the base station can be a base station for which example method 1500 or act 1420 has been enacted. At act 1610, CQI and allowable MCS for physical resource block in a set of PRBs allocated to non-GBR traffic can be acquired. The set of PRBs can be identified in a CRRL, which can be generated as part of a second scheduling phase (e.g., example method 1500). At act 1620, it can be determined if current or nearly current load in the base station requires additional PRBs for non-GBR traffic. In a scenario, load condition(s) can prevent delivery of non-GBR packets at a currently specified MCS. When determined that additional PRBs are required, a set of unused PRBs reserved for GBR traffic can be unmasked at act 1630; unmasking includes removal, e.g., through suitable tagging, of a PRB block in an RRL and inclusion of the unmasked resources in a CRRL linked to the RRL. At act 1640, unmasked PRBs are allocated to the non-GBR traffic to augment the set of PRBs allocated to non-GBR traffic. Conversely, when determined that additional PRBs are not required, logic flow of the subject example method can be directed to act 1650.

At act 1650, based on the allocated resources, non-GBR traffic according to fair queuing (e.g., WFQ) can be scheduled. The allocated resources include any unmasked PRBs that may result from determination in act 1620. At act 1660, re-transmission of a portion of the non-GBR traffic can be scheduled based on delivery conditions.

Figure 17:
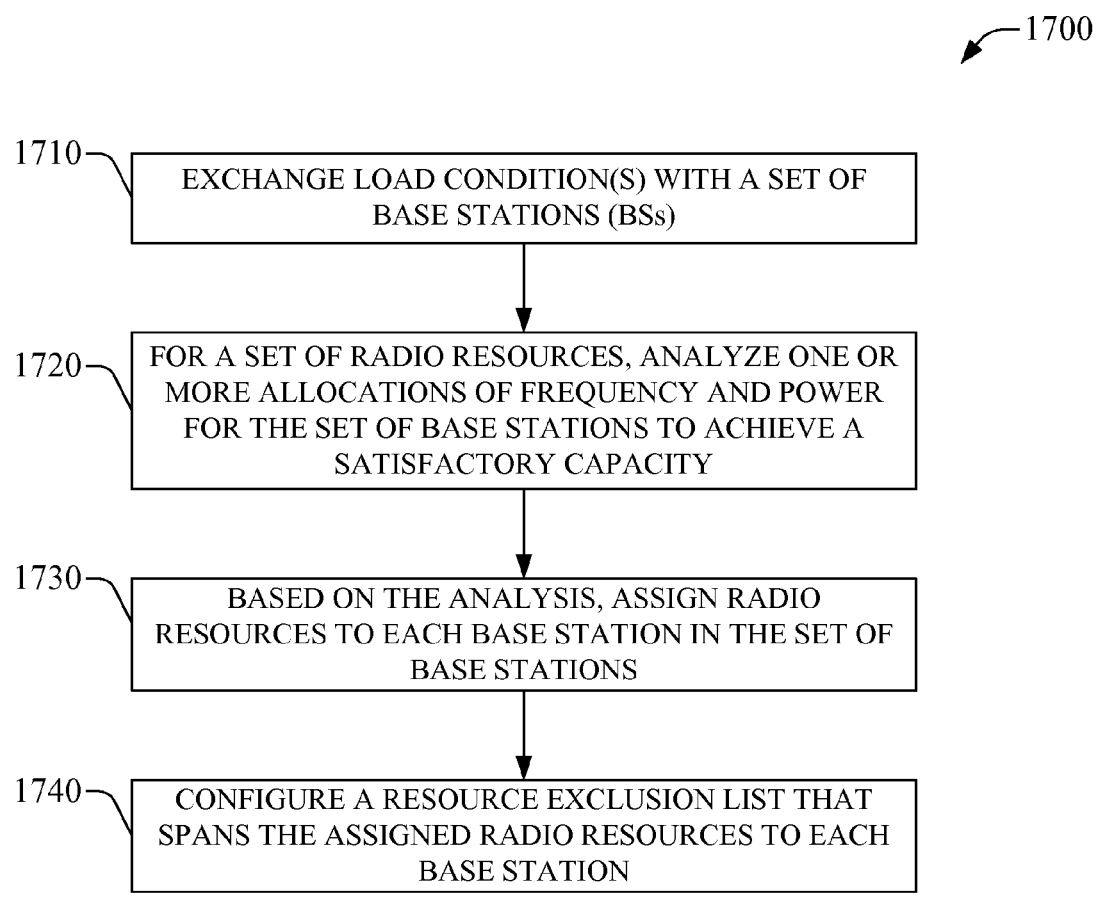
FIG. 17 is a flowchart of an example method for allocating a set of physical resource blocks for a set of base stations according to aspects described herein.

FIG. 17 is a flowchart of an example method 1700 for allocating a set of physical resource blocks for a set of base stations according to aspects described herein. The subject example method can be enacted as part of act 1410 described supra. A base station or one or more components therein can enact the subject example method. In addition or in the alternative, one or more processors also can enact, at least in part, the subject example method. The one or more processors (i) can be configured to provide or provide at least part of the functionality to the base station or the one or more components therein, or (ii) execute the one or more components or a set of code instructions that implements such one or more components and associated functionality. At act 1710, load condition(s) can be exchanged with a set of based stations (BSs), which can be neighboring base stations of the base station that implements the subject example method.

At act 1720, based on the load condition(s) and for a set of radio resources (e.g., PRBs), one or more allocations of frequency resources and power for the set of base stations can be analyzed to achieve a satisfactory capacity. As described supra, in the subject disclosure, an allocation of frequency resources can determine color saturation of a base station, whereas power allocation can define color luminance of the base station; in one or more embodiments, color luminance can be adjusted for one or more sets of frequency-time resources, e.g., set of PRBs, within the bounds of a color saturation.

In an aspect, a satisfactory capacity can be the capacity that optimizes capacity of the set of base stations; thus, a satisfactory capacity can be an optimized capacity. However, magnitude of the satisfactory capacity can be determined by a network operator based at least in part historical values of capacity metrics for the set of base stations; for example, a satisfactory capacity can be the one that is above average capacity estimated over a particular period (e.g., a day, a week, a month . . . ). Analysis can be performed by a component within the base station that enacts the subject method. In the alternative or in addition, one or more network components can perform the analysis at the request of such base station and deliver analysis results to the base station. The analysis can be conducted, at least in part, through simulation of capacity based on load condition(s). At act 1730, based on the analysis, radio resources (e.g., PRBs) can be assigned to each base station in the set of base stations. At act 1740, a resource exclusion list (REL) that spans the assigned radio resources to each base station can be configured.

Figure 18:
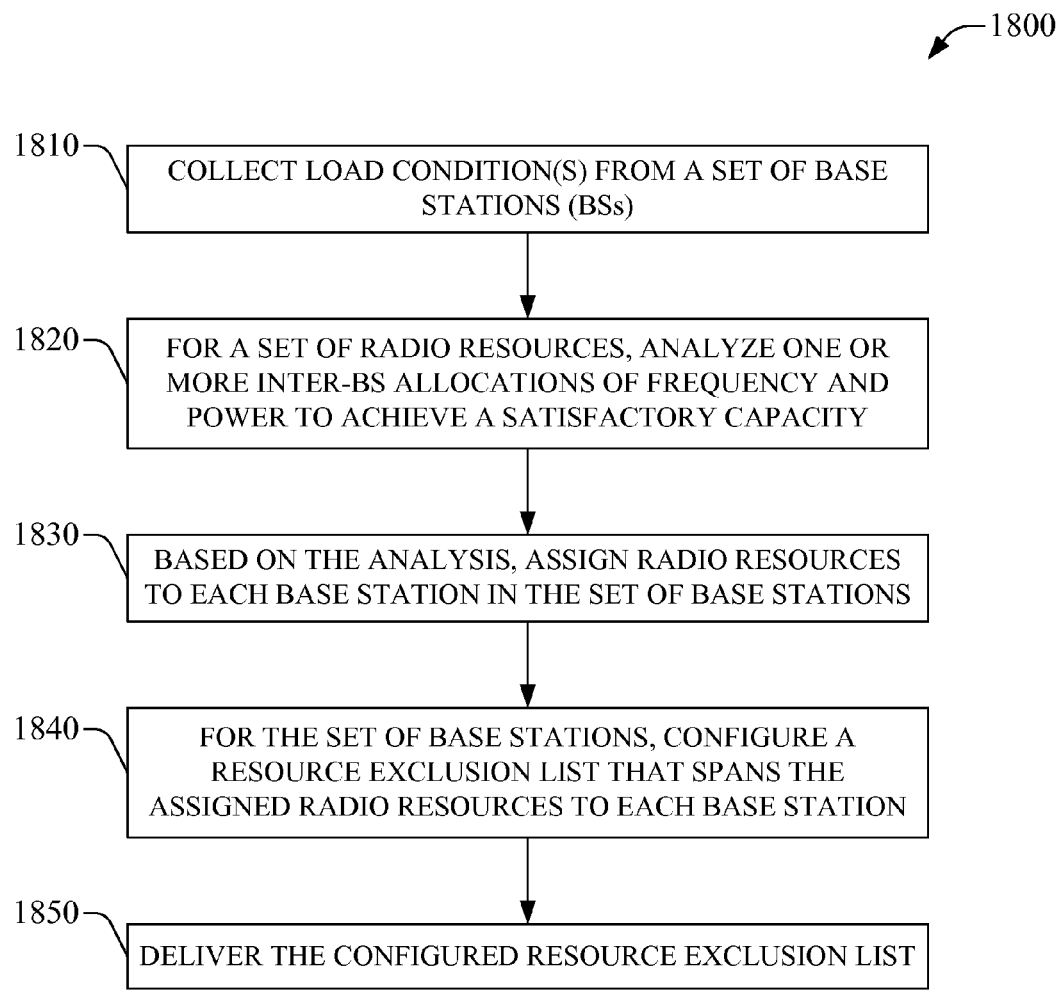
FIG. 18 presents a flowchart of an example method for allocating a set of physical resource blocks for a set of base stations according to aspects described herein.

FIG. 18 is a flowchart of an example method 1800 for allocating a set of physical resource blocks for a set of base stations according to aspects described herein. The subject example method can be enacted as part of act 1410 described supra. One or more network components can enact the subject example method. In addition or in the alternative, one or more processors also can enact, at least in part, the subject example method. The one or more processors (a) are configured to provide or provide at least part of the functionality to the one or more components therein, or (b) execute the one or more components or a set of code instructions that implements such one or more components and associated functionality. At act 1810, load condition(s) can be collected from a set of based stations (BSs). At act 1820, based on the load condition(s) and for a set of radio resources (e.g., PRBs), one or more allocations of frequency resources and power for the set of base stations can be analyzed to achieve a satisfactory capacity.

As described supra, satisfactory capacity can optimize capacity of the set of base stations. However, magnitude of the satisfactory capacity can be determined by a network operator based at least in part historical values of capacity metrics for the set of base stations; for example, a satisfactory capacity can be the one that is above average capacity estimated over a particular period (e.g., a day, a week, a month . . . ). Analysis can be performed by the one or more network components that enact the subject method. The analysis can be conducted, at least in part, through simulation of capacity based on load condition(s). At act 1830, based on the analysis, radio resources (e.g., PRBs) can be assigned to each base station in the set of base stations. At act 1840, for each base station in the set of base stations, a resource exclusion list (REL) that spans the assigned radio resources can be configured. As indicated hereinbefore, REL and configurations thereof can partition EM radiation spectrum available to the telecommunication carrier that administers the set of base stations, and record allocation(s) of spectrally disparate frequency resources, or color(s), to each base station in the set of base stations. At act 1850, the configured REL can be delivered.

Figure 19:
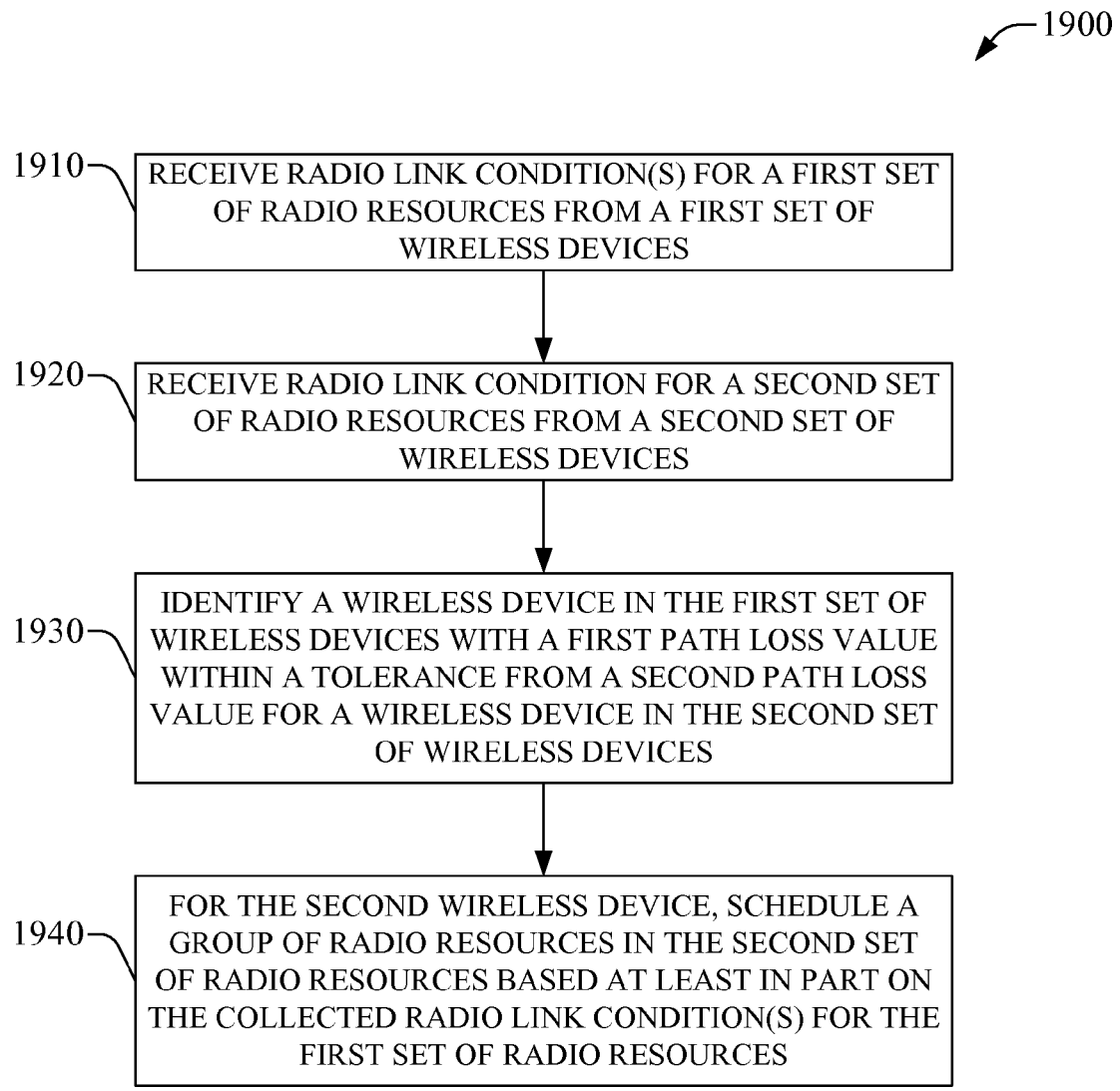
FIG. 19 displays a flowchart of an example method for scheduling radio resources for a wireless device that consumes high-priority traffic in accordance with aspects described herein.

FIG. 19 is a flowchart of an example method 1900 for scheduling radio resources for a wireless device that consumes, e.g., transmits and receives, high-priority traffic (e.g., GBR flow(s) 224) in accordance with aspects described herein. While the illustrated for wireless device(s), the subject example method can be effected for most any or any device that can communicate wirelessly. The subject example method can be enacted as part of act 1410 described supra. One or more network components can enact the subject example method. In addition or in the alternative, one or more processors also can enact, at least in part, the subject example method. The one or more processors (a) can be configured to provide or provide at least part of the functionality to the one or more network components, or component(s) therein; or (b) can execute the one or more network components or a set of code instructions that implements such one or more network components and associated functionality.

At act 1910, radio link condition(s) for a first set of radio resources can be received from a first set of wireless devices, e.g., via a component that resides within a base station that hosts a multi-stage scheduler platform (e.g., scheduler platform 310) that operates in accordance with one or more aspects described herein. The first set of radio resources can include frequency resources that span various portions of a color allocation, e.g., frequency resources in blocks $420_1$ and $420_2$, for disparate coverage cells. The first set of wireless devices can include wireless devices that operate in one or more coverage cells and consume low-priority traffic (e.g., n-GBR flow(s) 226). At act 1920, radio link condition(s) for a second set of resources can be received from a second set of wireless devices. Similar to the first set of wireless devices, the second set of wireless devices can include wireless devices that operate in one or more coverage cells. However, differently from the first set of wireless devices, wireless device(s) in the second set of wireless devices can consume high-priority traffic (e.g., GBR flow(s) 224). In an aspect, the second set of radio resources can span various portions of a color allocation and can overlap, at least in part, with the first set of radio resources. In one or more scenarios, either act 1910 or act 1920, or both, can be effected as part of acts 1310 or 1410.

At act 1930, a first wireless device (e.g., UE $415_1$) that can be part of the first set of wireless devices can be identified, the first wireless device has a first path loss value within a tolerance from a second path loss value for a second wireless device (e.g., UE $415_2$) in the second set of wireless devices. The second wireless device can operate in the same cell (e.g., cell $405_1$) in which the first wireless device operates. Identifying the first wireless device can include assessing a path loss metric for one or more wireless devices in the first set of wireless devices and in the second set of wireless devices. In addition, based on value(s) of the assessed path loss metric, identifying the first wireless device can include generating one or more groups or segments of wireless devices with value(s) of path loss metrics within a predetermined interval. At act 1940, for the second wireless device, a group of radio resources in the second set of radio resources can be scheduled based at least in part on the collected radio link condition(s) for the first set of radio resources. Scheduling of the group of radio resources can be directed to granting radio resources for telecommunication of high-priority traffic (e.g., GBR flow(s) 224). In an aspect, the scheduling of the group of radio resources can be accomplished through implementation of example method 1400.

Figure 20:
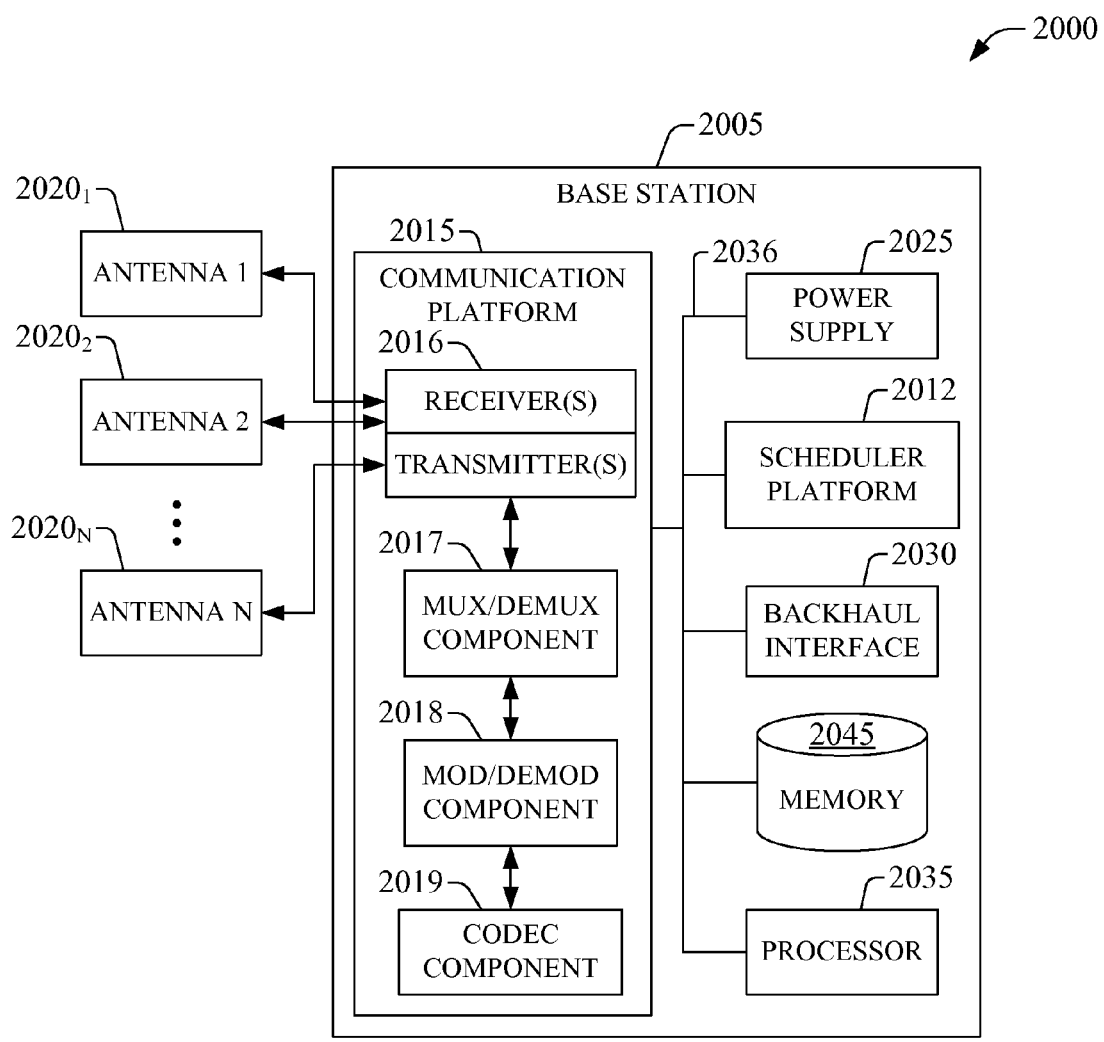
FIG. 20 illustrates a block diagram of an example embodiment of an access point to implement and exploit one or more features or aspects of the subject disclosure.

To provide additional context for features or aspects of the subject disclosure, FIG. 20 illustrates a block diagram of an example embodiment of a base station that can implement or exploit one or more features or aspects of the subject disclosure. In embodiment 2000, base station 2005 can receive and transmit signal(s) (e.g., attachment signaling) from and to wireless devices like femto access points, access terminals, wireless ports and routers, or the like, through a set of antennas $2020_1$-$2020_N$ (N can be a positive integer). It should be appreciated that antennas $2020_1$-$2020_N$ are a part of communication platform 2015, which comprises electronic components and associated circuitry that provides for processing and manipulation of received signal(s) and signal(s) to be transmitted. In an aspect, communication platform 2015 includes receiver(s)/transmitter(s) 2016 that can convert signal from analog to digital upon reception, and from digital to analog upon transmission.

In addition, receiver(s)/transmitter(s) 2016 can divide a single data stream into multiple, parallel data streams, or perform the reciprocal operation. Coupled to receiver/transmitter 2016 can be a multiplexer/demultiplexer 2017 that facilitates manipulation of signal in time and frequency space. Electronic component 2017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2017 can scramble and spread information (e.g., codes) according to substantially any code known in the art; e.g., Hadamard-Walsh codes, Baker codes, Kasami codes, polyphase codes, and so on. A modulator/demodulator 2018 can also be a part of communication platform 2015, and can modulate information according to multiple modulation techniques (e.g., MCSs), such as frequency modulation, amplitude modulation (e.g., M-ary quadrature amplitude modulation (QAM), with M a positive integer), M-ary phase-shift keying (PSK), and the like. Communication platform 2015 also includes a coder/decoder (codec) component 2019 that can facilitate decoding received signal(s), and coding signal(s) to convey.

Base station 2005 also includes a processor 2035 configured to confer functionality, at least in part, to substantially any electronic component in base station 2005. In particular, processor 2035 can facilitate determination of propagation delay information of RF signal, or microwave signal, between communication platform 2015 and antennas $2020_1$-$2020_N$ in accordance with various aspects and embodiments disclosed herein. Power supply 2025 can attach to a power grid and can include one or more power sources (or power components) and one or more transformers to achieve power level(s) that can operate base station 2005 components and circuitry. Additionally, power supply 2025 can include a rechargeable power source, or power component, such as industrial-grade rechargeable batteries or fuel-operated power generators, to ensure operation when base station 2005 can be disconnected from the power grid or in instances the power grid is not operating. Base station 2005 also includes a backhaul interface 2030 that can allow connection to backhaul link(s) and other link(s) that enable, at least in part, operation of base station 2005. Backhaul interface 2030 can enable, at least in part, communication (e.g., reception or delivery) of data or signaling to disparate base stations; for instance, base station 2005 can receive or convey load condition(s) 202 (not shown in FIG. 20) through backhaul interface 2030.

Processor 2035 also can be functionally connected to communication platform 2015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 2035 can be functionally connected, via a data or system bus 2036, to scheduler platform 2012 and other components of base station 2005 to provide, at least in part functionality to each of such platform and components. Bus 2036 can be embodied in at least one of a memory bus, a system bus, an address bus, or a message bus for data exchange. In addition bus 2036 also can serve as a link or conduit to supply power to communication platform 2015.

In base station 2005, memory 2045 can store data structures, code instructions and program modules, including operating system(s) for the base station; system or device information; code sequences for scrambling; spreading and pilot transmission; location intelligence storage; default template(s) for preferred color allocations; templates for service curves and cumulative service curves; over-the-air propagation models, and so on. Processor 2035 can be coupled to the memory 2045 in order to store and retrieve information necessary to operate and/or confer functionality to communication platform 2015, scheduler component 2012, and other components (not shown) of access point 2005. Processor 2035 can execute code instructions (not shown) retained in memory 2045 to implement functional elements (e.g., component(s), platform(s) . . . ) of base station 2005, or provide, at least in part, functionality to such functional elements.

Figure 21:
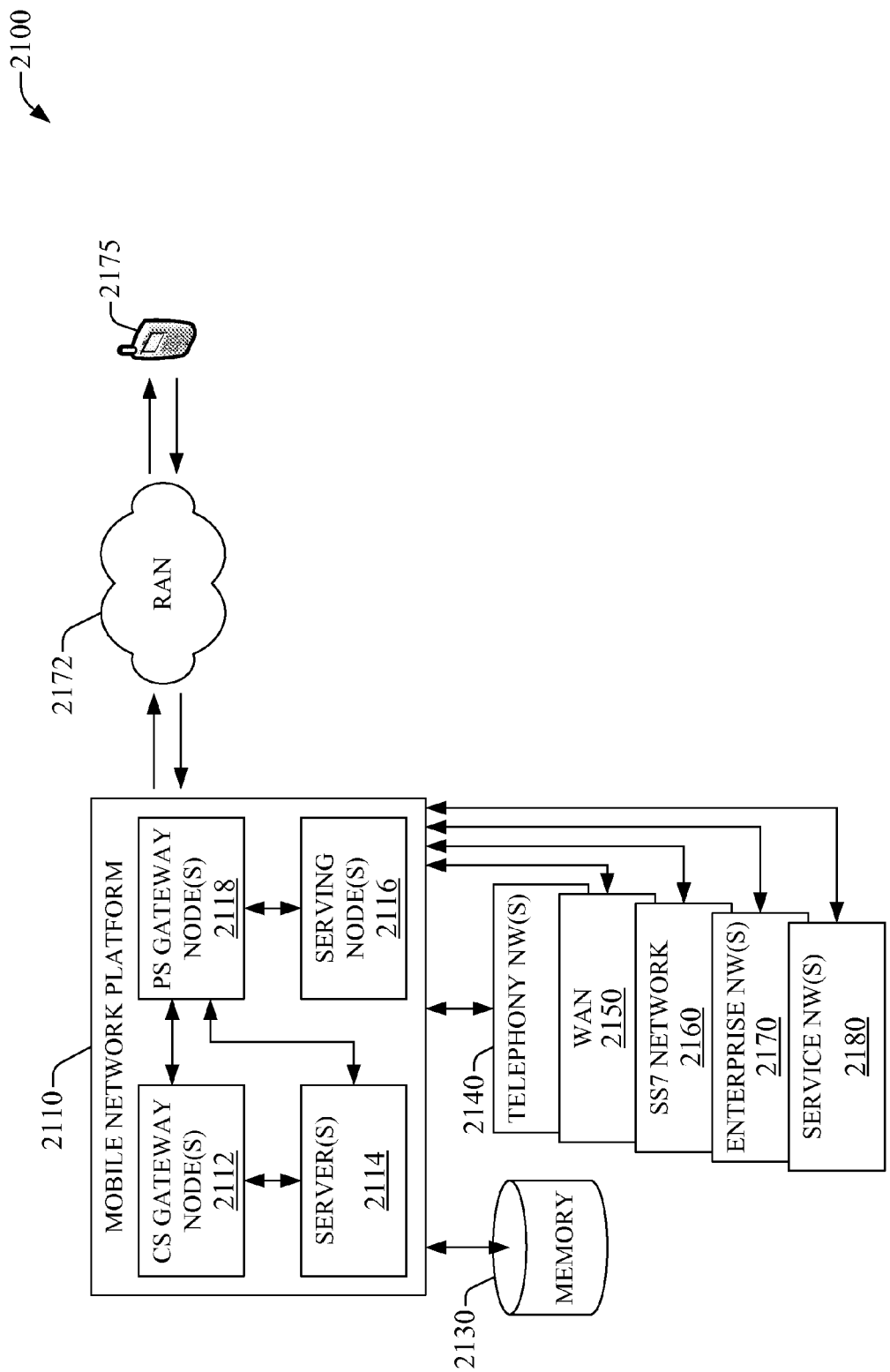
FIG. 21 is a block diagram of an example embodiment of a mobile network platform to implement and exploit various features or aspects of the subject disclosure.

FIG. 21 presents an example embodiment 2100 of a mobile network platform 2110 that can implement and exploit one or more aspects of the subject disclosure described herein. Wireless network platform 2110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 2110 can communicate with a mobile device 2175, or most any device with wireless communication capabilities, through a RAN 2172. Mobile network platform 2110 includes CS gateway node(s) 2112 that can interface CS traffic received from legacy networks like telephony network(s) 2140 (e.g., public switched telephone network (PSTN), or public land mobile network (PLMN)) or a signaling system #7 (SS7) network 2160. Circuit switched gateway node(s) 2112 can authorize and authenticate traffic (e.g., voice) arising from such networks.

Additionally, CS gateway node(s) 2112 can access mobility, or roaming, data generated through SS7 network 2160; for instance, mobility data stored in a visited location register (VLR), which can reside in memory 2130. Moreover, CS gateway node(s) 2112 interfaces CS-based traffic and signaling and PS gateway node(s) 2118. As an example, in a 3GPP UMTS network, CS gateway node(s) 2112 can be realized at least in part in gateway General Packet Radio Service (GPRS) support node(s) (GGSN). It should be appreciated that functionality and specific operation of CS gateway node(s) 2112, PS gateway node(s) 2118, and serving node(s) 2116, can be provided and dictated by radio technology(ies) utilized by mobile network platform 2110 for telecommunication.

In the subject disclosure, in addition to receiving and processing CS-switched traffic and signaling, PS gateway node(s) 2118 can authorize and authenticate PS-based data sessions with served mobile devices. Data sessions can include traffic, or content(s), exchanged with networks external to the wireless network platform 2110, like wide area network(s) (WANs) 2150, service network(s) 2180, and enterprise network(s) 2170, which can be embodied in local area network(s) (LANs), can also be interfaced with mobile network platform 2110 through PS gateway node(s) 2118. It is to be noted that WANs 2150 and/or service network(s) 2180 can embody, at least in part, a service network(s) like IP multimedia subsystem (IMS) core(s). Based on radio technology layer(s) (not shown) available to mobile network platform 2110, packet-switched gateway node(s) 2118 can generate packet data protocol contexts when a data session is established; other data structures that facilitate routing of packetized data also can be generated. To that end, in an aspect, PS gateway node(s) 2118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 2100, wireless network platform 2110 also includes serving node(s) 2116 that, based upon available radio technology layer(s) within technology resource(s) 2117, can convey the various packetized flows of data streams received through PS gateway node(s) 2118. It is to be noted that for technology resource(s) 2117 that rely primarily on CS communication, server node(s) can deliver traffic without reliance on PS gateway node(s) 2118; for example, server node(s) can embody at least in part a mobile switching center. As an example, in a 3GPP UMTS network, serving node(s) 2116 can be embodied in serving GPRS support node(s) (SGSN).

For radio technologies that exploit packetized communication, server(s) 2114 in mobile, or wireless, network platform 2110 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 2110, or at least a portion of location PDFs. Data streams (e.g., content(s) that are part of a voice call or data session) can be conveyed to PS gateway node(s) 2118 for authorization/authentication and initiation of a data session, and to serving node(s) 2116 for communication thereafter. In addition to application server, server(s) 2114 can include utility server(s), a utility server can include a provisioning server, an operations and maintenance server, a security server that can implement at least in part a certificate authority and firewalls as well as other security mechanisms, and the like. In an aspect, security server(s) can secure communication served through wireless network platform 2110 to ensure network's operation and data integrity in addition to authorization and authentication procedures that CS gateway node(s) 2112 and PS gateway node(s) 2118 can enact.

Moreover, provisioning server(s) can provision services from external network(s) like networks operated by a disparate service provider; for instance, wide area network (WAN) 2150 or Global Positioning System (GPS) network(s) (not shown). Provisioning server(s) can also provision coverage through networks associated to wireless network platform 2110 (e.g., deployed and operated by the same service provider), such as femtocell network(s) (not shown) that enhance wireless service coverage within indoor confined spaces and offload RAN 2172 resources in order to enhance subscriber service experience within a home or business environment.

It is to be noted that server(s) 2114 can include one or more processors configured to confer at least in part the functionality of macro network platform 2110. To that end, the one or more processor can execute code instructions stored in memory 2130, for example. It is should be appreciated that server(s) 2114 can embody at least a portion of scheduler platform 310 or network node 1210, which operates in substantially the same manner as described hereinbefore.

In example embodiment 2100, memory 2130 can store information related to operation of wireless network platform 2110. In particular, memory 2130 can include contents of memory 320 in example system 300. Other operational information can include provisioning information of mobile devices served through wireless platform network 2110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 2130 can also store information from at least one of telephony network(s) 2140, WAN 2150, enterprise network(s) 2170, or SS7 network 2160.

Aspects, features, or advantages of the subject disclosure described in the subject specification can be exploited in substantially any wireless communication technology. For instance, Zigbee, and other 802.xx wireless technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced, etc. Additionally, substantially all aspects of the subject disclosure as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    first scheduling, by a system comprising a processor and based on a load condition associated with a set of base station devices, a first set of guaranteed-bit-rate data flows for the set of base station devices according to a first portion of a predetermined scheduling period; and
    second scheduling, by the system subsequent to the first scheduling and according to a second portion of the predetermined scheduling period that is less than the first portion of the predetermined scheduling period, a second set of non-guaranteed-bit-rate data flows for the set of base station devices based on an available electromagnetic radiation spectrum.

2. The method of claim 1, wherein the first scheduling comprises scheduling the first set of guaranteed-bit-rate data flows based on a change in communication traffic associated with the set of base station devices.

3. The method of claim 1, wherein the first scheduling comprises scheduling the first set of guaranteed-bit-rate data flows based on a change in inter-cell interference associated with a sector of a wireless coverage area associated with the set of base station devices.

4. The method of claim 1, wherein the first scheduling comprises:
    allocating a set of physical resource blocks for the set of base station devices based on the load condition; and
    scheduling the first set of guaranteed-bit-rate data flows based on the set of physical resource blocks.

5. The method of claim 4, wherein the allocating the set of physical resource blocks comprises allocating frequency resources spanning a set of frequency sub-carriers associated with respective bandwidths during a transmission time interval.

6. The method of claim 4, wherein the allocating the set of physical resource blocks comprises:
    for a set of electromagnetic radiation resources, analyzing an allocation of frequency and power for the set of base station devices to achieve a defined capacity; and in response to the analyzing the allocation, assigning the set of physical resource blocks to base station devices of the set of base station devices.

7. The method of claim 6, further comprising:
configuring, by the system, a resource exclusion list spanning the set of physical resource blocks; and
sending, by the system, the resource exclusion list directed to a base station device of the set of base station devices.

8. The method of claim 4, wherein the allocating the set of physical resource blocks comprises:
receiving the load condition from a base station device of the set of base station devices;
for a set of electromagnetic radiation resources, analyzing an inter-base station device allocation of frequency and power to a achieve a defined capacity;
in response to the analyzing, assigning the set of physical resource blocks to the set of base station devices;
configuring, for the set of base station devices, a resource exclusion list spanning the set of physical resource blocks; and
sending the resource exclusion list directed to the base station device.

9. The method of claim 1, wherein the second scheduling comprises scheduling the second set of non-guaranteed-bit-rate data flows for the set of base station devices based on a physical resource block associated with a sub-carrier bandwidth.

10. The method of claim 1, wherein the second scheduling comprises scheduling the second set of non-guaranteed-bit-rate data flows for the set of base station devices based on weighted queuing.

11. The method of claim 1, wherein the second scheduling comprises:
acquiring information associated with a channel quality indicator and a coding scheme indicator for a frequency-time resource allocated to the second set of non-guaranteed-bit-rate data flows; and
augmenting the frequency-time resource with an unused electromagnetic radiation spectrum based on the information.

12. The method of claim 1, wherein the first scheduling comprises:
acquiring information associated with a channel quality indicator and a modulation and coding scheme indicator for a set of physical resource blocks;
computing, using a service function, flow capacity based on the information; and
scheduling the first set of guaranteed-bit-rate data flows based on the flow capacity.

13. The method of claim 12, further comprising:
generating, by the system, a resource reservation list based on the flow capacity and bit requirements of data flows of the first set of guaranteed-bit-rate data flows,
wherein the scheduling comprises scheduling the first set of guaranteed-bit-rate data flows based on the resource reservation list.

14. The method of claim 1, wherein the second scheduling comprises scheduling non-guaranteed-bit-rate traffic based on queuing.

15. A non-transitory computer-readable storage medium comprising computer executable instructions that, in response to execution, cause a computing system comprising a processor to perform operations, comprising:
first scheduling a first set of guaranteed-bit-rate data flows for a first portion of a predetermined scheduling period for a set of base station devices based on a load condition associated with the set of base station devices; and
second scheduling a second set of non-guaranteed-bit-rate data flows for a second portion of the predetermined scheduling period for the set of base station devices based on available electromagnetic radiation resources, subsequent to the first scheduling the first set of guaranteed-bit-rate data flows, wherein the first portion is greater than the second portion.

16. The non-transitory computer-readable medium of claim 15, wherein the first scheduling comprises allocating a set of electromagnetic radiation resources for the set of base station devices based on the load condition and scheduling the set of guaranteed-bit-rate data flows based on the set of electromagnetic radiation resources.

17. A system, comprising:
a memory to store instructions; and
a processor, coupled to the memory, that facilitates execution of the instructions to perform operations, comprising:
first scheduling a guaranteed-bit-rate traffic flow for a first portion of a scheduling period for a set of base station devices based on a load condition associated with the set of base station devices; and
in response to the first scheduling the guaranteed-bit-rate traffic flow, second scheduling a non-guaranteed-bit-rate traffic flow for a second portion of the scheduling period for the set of base station devices based on an available electromagnetic resource, wherein the second portion is smaller than the first portion.

18. The system of claim 17, wherein the operations further comprise:
allocating physical resource blocks for the set of base station devices; and
scheduling the guaranteed-bit-rate traffic flow based on the physical resource blocks.

19. The system of claim 18, wherein the allocating comprises:
allocating the physical resource blocks for the set of base station devices based on inter-cell interference associated with the set of base station devices.

20. The system of claim 17, wherein the operations further comprise:
receiving information associated with channel quality indicators and modulation and coding scheme indicators for frequency-time resources allocated to traffic flows of the non-guaranteed-bit-rate traffic flow; and
scheduling the non-guaranteed-bit-rate traffic flow based on the information.

* * * * *